(12) United States Patent
Imamura

(10) Patent No.: US 8,130,271 B2
(45) Date of Patent: Mar. 6, 2012

(54) IMAGE DISPLAY METHOD AND IMAGE DISPLAY APPARATUS

(75) Inventor: Kosuke Imamura, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 731 days.

(21) Appl. No.: 12/261,418

(22) Filed: Oct. 30, 2008

(65) Prior Publication Data

US 2009/0160940 A1 Jun. 25, 2009

(30) Foreign Application Priority Data

Dec. 20, 2007 (JP) ................................. 2007-328570

(51) Int. Cl.
*G06K 9/20* (2006.01)
(52) U.S. Cl. ........................................................ 348/148
(58) Field of Classification Search .................. 348/148, 348/159; 345/629
See application file for complete search history.

(56) References Cited

U.S. PATENT DOCUMENTS 7,161,616 B1   1/2007  Okamoto et al.
2008/0056610 A1*  3/2008  Kanda ........................... 382/282

FOREIGN PATENT DOCUMENTS

JP   3300334      4/2002
JP   2007-104373  4/2007

* cited by examiner

*Primary Examiner* — David Eng
(74) *Attorney, Agent, or Firm* — Brinks Hofer Gilson & Lione

(57) ABSTRACT

An image display method for displaying a combined image by capturing images at areas surrounding a vehicle includes a) calculating a plurality of displacement vectors for a plurality of points taken on images captured by a plurality of cameras upon the application of a load that changes the attitude of a camera on the vehicle, and b) determining each image borderline between two adjacent images such that a difference in the directions of displacement vectors in the neighborhood of each image borderline between two adjacent images does not exceed a predetermined angle.

20 Claims, 25 Drawing Sheets

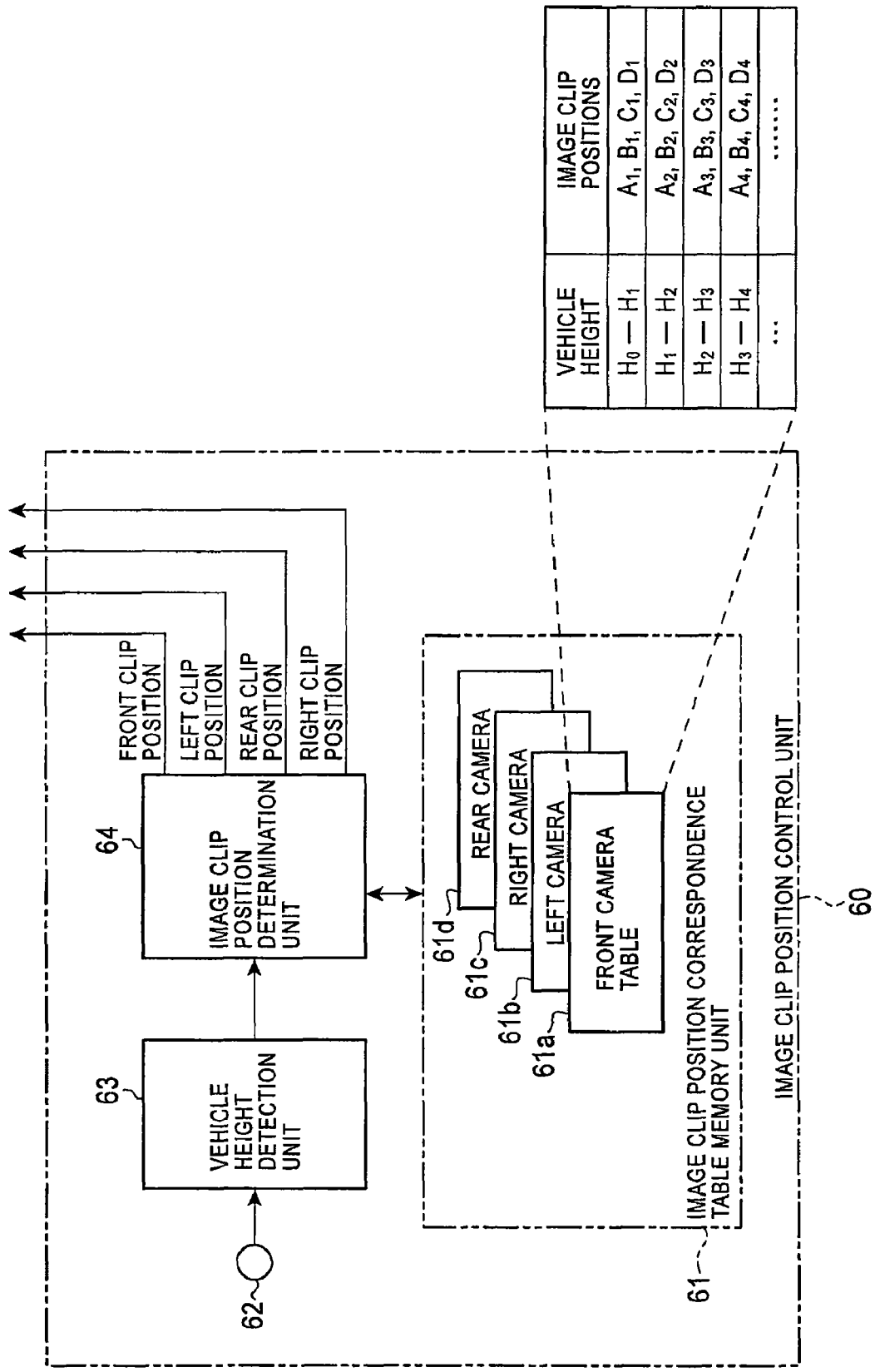

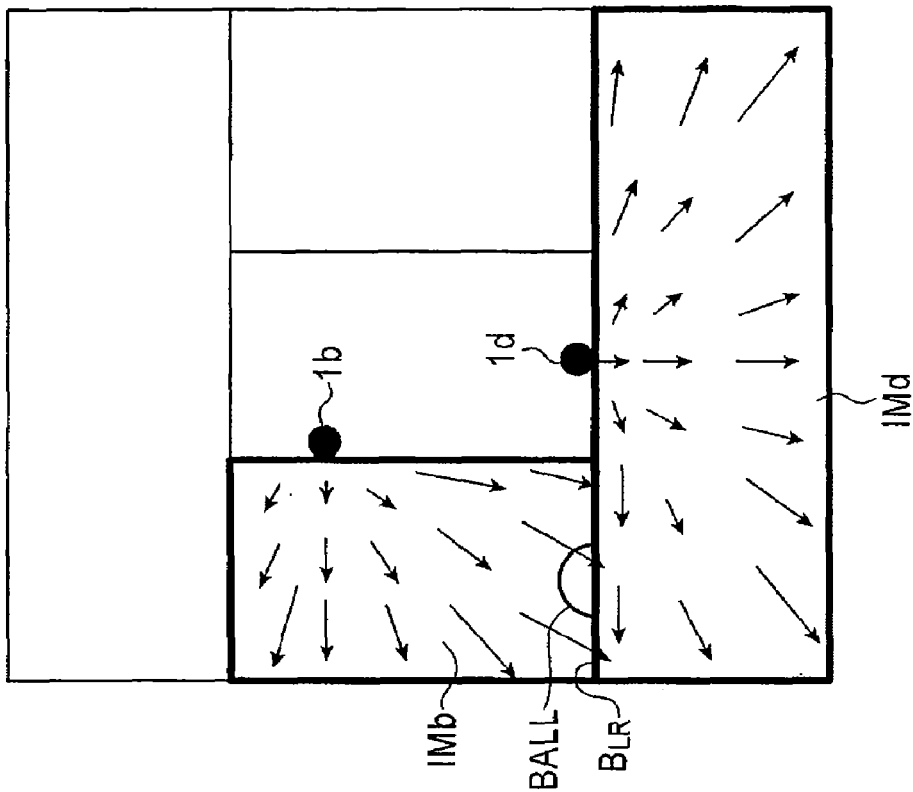
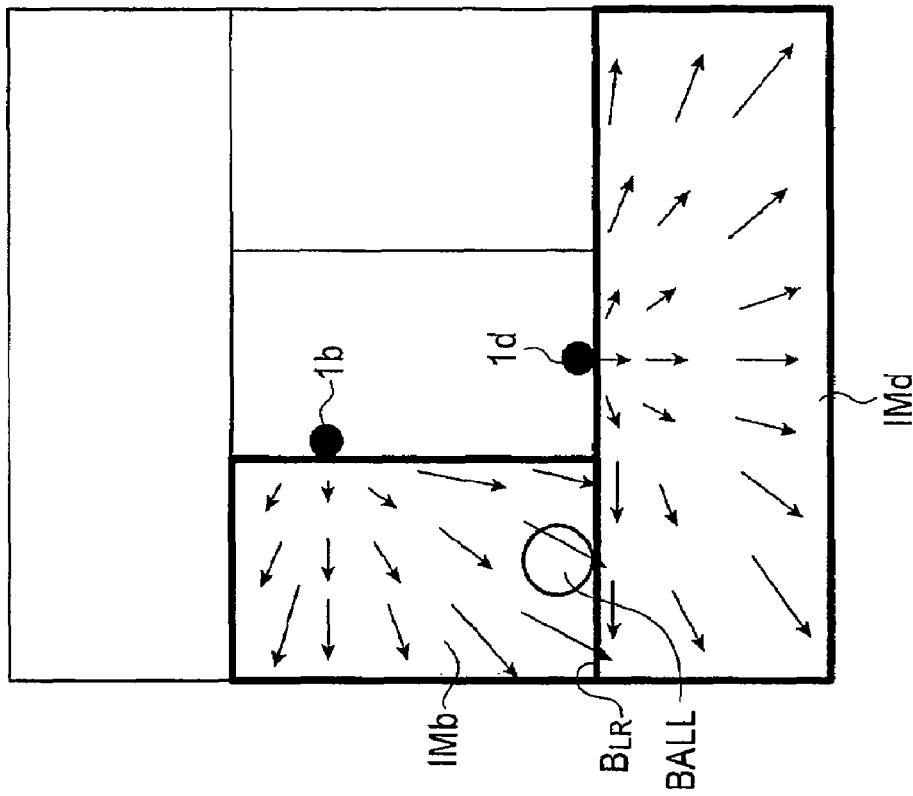

IMAGE DISPLAY METHOD AND IMAGE DISPLAY APPARATUS

PRIORITY CLAIM

This application claims the benefit of Japanese Patent Application No. 2007-328570, filed on Dec. 20, 2007, and which is incorporated by reference herein in its entirety.

BACKGROUND

1. Field of the Invention

The present invention relates to an image display method and an image display apparatus. In particular, the invention relates to an image display method for displaying a combined image that shows a vehicle observed from a virtual point of view taken above the vehicle. A plurality of cameras capture peripheral images at areas around the vehicle. The peripheral images are combined to form the combined image for display.

2. Description of the Related Art

Known driving support systems may assist a driver to park a car in a garage and/or in a parking space. Known system may display a top-view image, as described in Japanese Patent No. 3,300,334 ("JP '334"). In the top-view image display of JP '334, images are captured at areas surrounding a vehicle using a plurality of cameras. These pictures are hereafter referred to as "peripheral images". The peripheral images are combined with each other to form a synthesized image that shows the vehicle as observed from a virtual point of view taken above the vehicle. The combined top-view image is stored in a frame memory, and then is read out of the frame memory so as to be displayed on a monitor screen.

As shown in FIGS. 18A and 18B, a top-view image display system of the known system includes a plurality of fish-eye lens cameras 1a, 1b, 1c, and 1d, each of which captures images at corresponding peripheral areas around a vehicle 2. A fish-eye lens camera 1a is mounted at the front of the vehicle 2, fish-eye lens camera 1b is mounted at the left side of the vehicle, fish-eye lens camera 1c is mounted at the right side of the vehicle, and fish-eye lens camera 1d is mounted at the rear of the vehicle.

An image-combination processing unit 3 generates a combined image from the peripheral images captured by the fish-eye lens cameras 1a-1d. The combined image shows the vehicle 2 observed from a certain point over the vehicle, which is a virtual point of view 4. An example of the virtual point of view 4 that is taken as the combination of the peripheral images into a top-view image, is shown together with the vehicle 2 in FIG. 18C. The combined image is displayed on a monitor 5 to assist a driver when parking the vehicle 2.

When combining these peripheral images into one top-view image, the image-combination processing unit 3 uses a mapping table to map an image portion that is captured by each fish-eye lens camera 1a-1d onto the frame memory for display. FIG. 19 is a diagram that schematically illustrates an example of the mapping of fish-eye images IMa, IMb, IMc, and IMd onto a frame memory 6, which corresponds to a display screen. The fish-eye images IMa, IMb, IMc, and IMd are mapped into the corresponding peripheral areas 6a, 6b, 6c, and 6d of the frame memory 6, respectively. An image of the vehicle 2, referred to as a vehicle image 7, is mapped onto the center area of the frame memory 6. The vehicle image 7 is an image that has been taken in advance and is stored as a pre-captured image. Through the mapping of these fish-eye images IMa, IMb, IMc, and IMd, as well as the vehicle image 7, into the corresponding areas of the frame memory 6, a full single-screen top-view image is generated on the frame memory 6.

FIGS. 20A, 20B, and 20C are a set of diagrams that schematically illustrates a mapping process. The fish-eye lens cameras 1a, 1b, 1c, and 1d, capture peripheral-area pictures in front of the vehicle 2, to the left of the vehicle, to the right of the vehicle, and behind the vehicle, respectively. Each of the fish-eye cameras 1a, 1b, 1c, and 1d is capable of taking a picture through its fish-eye lens with a picture area range of 180°.

Specifically, camera 1a can capture an image at a 180-degree area in front of the vehicle 2 beyond the line F-F shown in FIG. 20A, camera 1d can capture an image at a 180-degree area in back of the vehicle beyond the line B-B shown therein, camera 1b can capture an image at a 180-degree area to the left of the vehicle beyond the line L-L, and camera 1c can capture an image at a 180-degree area to the right of the vehicle beyond the line R-R.

However, a distorted pattern is acquired as a result of the capturing a rectangular grid that is drawn on the ground to the left of the vehicle 2 by means of the fish-eye lens camera 1b. An example of the original rectangular grid pattern is shown in FIG. 20B. An example of the distorted pattern is shown in FIG. 20C. The distorted pattern is hereafter referred to as a fish-eye figure.

A fish-eye figure that is captured by each camera is subjected to distortion correction. After the distortion correction, each image is projected onto the corresponding area on the ground. By this means, it is possible to obtain a top-view image. Reference numerals shown in a rectangular grid in FIG. 6 and the fish-eye of FIG. 7 indicate the correspondence of portions therebetween. That is, each area portion that is shown in the rectangular grid FIG. 6 corresponds to an area portion that is shown in the fish-eye FIG. 7 with the same reference numeral. In other words, the area portions 1, 2, 3, 4, 5, and 6 of the rectangular grid FIG. 6 correspond to the area portions 1, 2, 3, 4, 5, and 6 of the fish-eye FIG. 7, respectively. The distortion-corrected images of the corresponding area portions 1-6 of the fish-eye FIG. 7 are stored at positions in the frame memory 6 at which the area portions 1-6 of the rectangular grid FIG. 6 should be stored for the left camera 1b. Images captured by other cameras are stored in the frame memory 6 in the same manner as described above. By this means, it is possible to read the images that were captured by the fish-eye cameras 1a-1d and perform viewing-point conversion to display a figure on a monitor as if it were projected on the ground.

As explained above, in a top-view image display technique of JP '334, a plurality of fish-eye lens cameras acquires peripheral images and then combines, after the correction of distortion thereof, such fish-eye images into a single top-view image that shows a vehicle observed from a virtual point of view taken above the vehicle. A distortion correction value for the generation of a top-view image is typically set based on a certain static state of a vehicle. However, the body of a vehicle may tilt depending on various factors, such as the number of occupants including a driver and passengers, live load, and various driving conditions, such as a curve, acceleration, stop, and the like.

As the vehicle tilts, the "attitude" of a camera changes. The term "attitude" used in the description of this specification means "position" and "orientation" without any limitation thereto. FIGS. 21A and 21B schematically illustrate an example of a change in the attitude of a camera. FIG. 21A shows a pre-change static state in which the vehicle 2 is not tilted. In contrast, in FIG. 21B, the vehicle 2 is tilted by an angle of inclination θ because of the increased number of occupants. As shown in FIG. 21B, the position of the rear camera 1d has lowered due to the tilting of the vehicle 2. A top-view image display system of the JP '334 has a disadvantage in that the position of some part of an image is shifted to the outside of a display area boundary that was set in the process of distortion correction, and thus disappears due to such a change in the attitude of a camera.

In particular, a part of an image disappears at a border between two peripheral images arrayed adjacent to each other for the formation of a top-view image. A top-view image display system of the related art has a disadvantage in that if any object is located in this disappearance area, it is not possible or is very difficult to display the image without any missing portions.

FIGS. 22, 23A, 23B, 24A, 24B, 25, and 26 illustrate how an image partially disappears (appears) because of a change in the attitude of a camera, which occurs in the display system of the related art. FIG. 22 illustrates a plurality of displacement vectors for a plurality of points taken on the distortion-corrected fish-eye images IMa, IMb, IMc, and IMd, which are captured by the fish-eye lens cameras 1a, 1b, 1c, and 1d, respectively according to the related art. The displacement vectors are generated as a result of the application of a certain load that changes the attitude of a camera. In this drawing, the position of each point is denoted by a black circle. Each short line segment that extends from the black circle indicates both the direction of a displacement vector and the magnitude thereof. In FIG. 22, the reference numeral BLR denotes an image borderline between the left image IMb and the rear image IMd. The reference numeral BLF denotes an image borderline between the left image IMb and the front image IMa. The reference numeral BRR denotes an image borderline between the right image IMc and the rear image IMd. Finally, reference numeral BRF denotes an image borderline between the right image IMc and the front image IMa.

As shown in FIG. 22, the directions of displacement vectors significantly differ in the neighborhood of each rear image borderline between two adjacent images in a top-view image of the related art. In other words, the directions of displacement vectors in a border area of one image significantly differ from the directions of displacement vectors in the corresponding border area of another image that is adjacent thereto.

FIG. 23A is an enlarged view that schematically illustrates a border area of the left image IMb and the corresponding border area of the rear image IMd, with the image borderline BLR being formed therebetween according to the related art. Each reference numeral dLT denotes a displacement vector that is generated from a point in the left image IMb in the neighborhood of the image borderline BLR when a certain load that changes the attitude of the rear camera 1d. Each reference numeral dRE denotes a displacement vector that is generated from a point in the rear image IMd in the neighborhood of the image borderline BLR when a certain load that changes the attitude of the rear camera 1d As will be understood from the drawing, an area portion of the left image IMb, which is hereafter denoted as DAAR, disappears as the vehicle 2 is loaded. In addition, as a result of the application of such a load to the vehicle 2, a new rear image area portion APAR appears. An example of this new rear image area portion APAR is shown in FIG. 23B of the related art.

FIGS. 24A and 24B schematically illustrate displacement in a combined image according to the related art. More specifically, FIG. 24A shows a left-rear part of a combined image that is composed of composed the left image IMb and the rear image IMd, before the occurrence of displacement. FIG. 24B shows the left-rear part of a combined image that is composed of the left image IMb and the rear image IMd after the occurrence of displacement.

Before the occurrence of displacement, a ball (BALL) that lies in the neighborhood of the image borderline BLR is displayed as a circle in a faithful manner. However, after the occurrence of displacement, the ball is displayed as a partially hidden circle. The reason is because the directions of displacement vectors significantly differ in the neighborhood of the image borderline BLR. That is, as shown by arrows in the drawing, the directions of displacement vectors in a border area of the left image IMb significantly differ from the directions of displacement vectors in the corresponding border area of the rear image IMd.

FIG. 25 is a diagram that schematically illustrates a top-view image formed before the occurrence of displacement according to the related art. FIG. 26 schematically illustrates an example of a top-view image formed after the occurrence of displacement according to the related art. As will be understood from these drawings, the positions of segments (i.e., line segments) A and B have moved slightly downward after the occurrence of displacement. For this reason, the disappearance area portion DAAR of the left image IMb, which was shown before the occurrence of displacement in the top-view image of FIG. 25, has disappeared after the occurrence of displacement in the top-view image of FIG. 26. On the other hand, the appearance area portion APAR of the rear image IMd, which was not shown before the occurrence of displacement in the top-view image of FIG. 25, has appeared after the occurrence of displacement in the top-view image of FIG. 26.

Other known systems, which displays an object, such as an obstacle, in a faithful and easily viewable manner, is disclosed in Japanese Unexamined Patent Application Publication No. 2007-104373. The image display apparatus of JP 2007-104373 generates a combined image after changing the position of a borderline if any obstacle lies on the original borderline before the change thereof. By this means, JP 2007-104373 discloses generating a combined image without any obstacle being shown on the borderline. However, the above-identified related art is not directed to the prevention of partial disappearance of an image due to a change in the attitude of a camera or to the prevention of partial appearance of an image due to the same cause.

Known top-view image display systems are disadvantageous because some part of an image disappears near an image borderline due to a change in the attitude of a camera, which occurs when a vehicle is loaded. That part of the image, which was not shown before the change, appears due to a change therein. The reason why such partial disappearance of an image and partial appearance thereof occurs, is that the directions of displacement vectors significantly differ in the neighborhood of an image borderline. The displacement vectors are generated at the time when a certain load that changes the attitude of a camera is applied to the vehicle.

SUMMARY

An advantage of the invention is to prevent any part of an image from disappearing due to a change in the attitude of a camera, and to prevent any part of an image, which was not shown before the change, from appearing due to the same reason.

In a first aspect of the invention, an image display method displays a combined image by capturing images at areas surrounding a vehicle using a plurality of cameras and then combines the images captured by the plurality of cameras into a top-view image that shows the vehicle observed from a certain virtual point of view taken above the vehicle. The method includes a) calculating a plurality of displacement vectors for a plurality of points taken on the images when a certain load changes the attitude of a camera, and b) determining each image borderline between two adjacent images in such a manner that a difference in the directions of displacement vectors in the neighborhood of each image borderline between two adjacent images does not exceed a predetermined angle.

The method further includes clipping an image portion that is demarcated by two image borderlines out of the image captured by each of the plurality of cameras so as to generate the combined image.

The method also includes a) pre-storing correspondences between camera attitudes and sets of image clip positions, which are determined on the basis of the image borderlines, for each camera, b) measuring an actual camera attitude, and c) clipping an image area portion in accordance with a set of image clip positions that corresponds to the measured actual camera attitude for each camera to generate the combined image.

The method additionally includes a) pre-storing correspondences between the number of occupants of a vehicle and sets of image clip positions, which are determined on the basis of the image borderlines, for each camera b) detecting the actual number of the occupants of the vehicle, and c) clipping an image area portion in accordance with a set of image clip positions that correspond to the detected actual number of the occupants of the vehicle for each camera to generate the combined image.

The method also includes a) pre-storing correspondences between the total load weight of a vehicle, that is, the aggregate weight of occupants and luggage excluding the weight of the vehicle itself, and sets of image clip positions, which are determined on the basis of the image borderlines, for each camera, b) detecting the actual total load weight of the vehicle, and c) clipping an image area portion in accordance with a set of image clip positions that corresponds to the detected actual total load weight of the vehicle for each camera to generate the combined image.

The method includes a) pre-storing correspondences between the height of a vehicle and sets of image clip positions, which are determined on the basis of the image borderlines, for each camera, b) detecting the actual height of the vehicle, c) and clipping an image area portion in accordance with a set of image clip positions that corresponds to the detected actual height of the vehicle for each camera so as to generate the combined image.

According to a second aspect of the invention, an image display apparatus displays a combined image by capturing images at areas surrounding a vehicle with the use of a plurality of cameras and then combines the images captured by the plurality of cameras into a top-view image that shows the vehicle observed from a certain virtual point of view taken over the vehicle. The image display apparatus includes a) a displacement vector calculating section that calculates a plurality of displacement vectors for a plurality of points taken on the images that are captured by the plurality of cameras upon the application of a certain load that changes the attitude of a camera to the vehicle, b) and an image borderline determining section that determines each image borderline between two adjacent images in such a manner that a difference in the directions of displacement vectors in the neighborhood of each image borderline between two adjacent images does not exceed a predetermined angle.

The apparatus further includes a) an image clip position determining section that determines positions at which an image portion should be clipped out of the image captured by each of the plurality of cameras on the basis of two image borderlines, and b) a combined-image generating section that generates the combined image by combining the clipped images with each other.

The apparatus additionally includes a) a table that pre-stores correspondences between camera attitudes and sets of image clip positions, which are determined on the basis of the image borderlines, for each camera, b) a measuring section that measures an actual camera attitude, c) an image clipping section that clips an image area portion in accordance with a set of image clip positions that corresponds to the measured actual camera attitude for each camera. and d) a combined-image generating section that generates the combined image by combining the clipped images with each other.

The apparatus further includes a) a table that pre-stores correspondences between the number of occupants of a vehicle and sets of image clip positions, which are determined on the basis of the image borderlines, for each camera, b) an occupant-number detecting section that detects the actual number of the occupants of the vehicle, c) an image clipping section that clips an image area portion in accordance with a set of image clip positions that corresponds to the detected actual number of the occupants of the vehicle for each camera, and d) a combined-image generating section that generates the combined image by combining the clipped images with each other.

Further included are a) a table that pre-stores correspondences between the total load weight of a vehicle, that is, the aggregate weight of occupants and luggage excluding the weight of the vehicle itself, and sets of image clip positions, which are determined on the basis of the image borderlines, for each camera, b) a load weight measuring section that detects the actual total load weight of the vehicle, c) an image clipping section that clips an image area portion in accordance with a set of image clip positions that corresponds to the detected actual total load weight of the vehicle for each camera, and d) a combined-image generating section that generates the combined image by combining the clipped images with each other.

Additionally included are a) a table that pre-stores correspondences between the height of a vehicle and sets of image clip positions, which are determined on the basis of the image borderlines, for each camera, b) a vehicle-height measuring section that detects the actual height of the vehicle, c) an image clipping section that clips an image area portion in accordance with a set of image clip positions that corresponds to the detected actual height of the vehicle for each camera, and d) a combined-image generating section that generates the combined image by combining the clipped images with one another.

According to an aspect of the present invention, each image borderline is determined in such a manner that a difference in the directions of displacement vectors in the neighborhood of the above-mentioned each image borderline between two adjacent images does not exceed a predetermined angle. It is ideal that each image borderline should be determined in such a manner that a difference in the directions of displacement vectors in the neighborhood of each image borderline between two adjacent images equals to 0°.

BRIEF DESCRIPTION OF THE DRAWINGS

FIG. 3A shows a left-rear part of a combined image that is composed of the left image and the rear image before the occurrence of a change in the attitude of a camera, whereas FIG. 3B shows the left-rear part of a combined image that is composed of the left image and the rear image after the occurrence of a change in the attitude of a camera;

FIG. 16 is a diagram that schematically illustrates an image clip position control unit according to an exemplary embodiment of the invention;

FIG. 21A shows a pre-change static state in which a vehicle is not tilted, whereas, in FIG. 21B, the vehicle is tilted because of the increased number of occupants;

FIG. 23A is an enlarged view that illustrates a border area of a left image and the corresponding border area of a rear image with an image borderline being formed therebetween according to the related art, whereas FIG. 23B shows a new rear image area portion that appears according to the related art;

FIGS. 24A and 24B schematically illustrate displacement in a combined image according to an exemplary embodiment of the invention. FIG. 24A shows a left-rear part of a combined image that is composed of the left image and the rear image before the occurrence of displacement, whereas FIG. 3B shows the left-rear part of a combined image that is composed of the left image and the rear image after the occurrence of displacement;

DESCRIPTION OF THE PREFERRED EMBODIMENTS

A. Overview of the Invention

Figure 1:
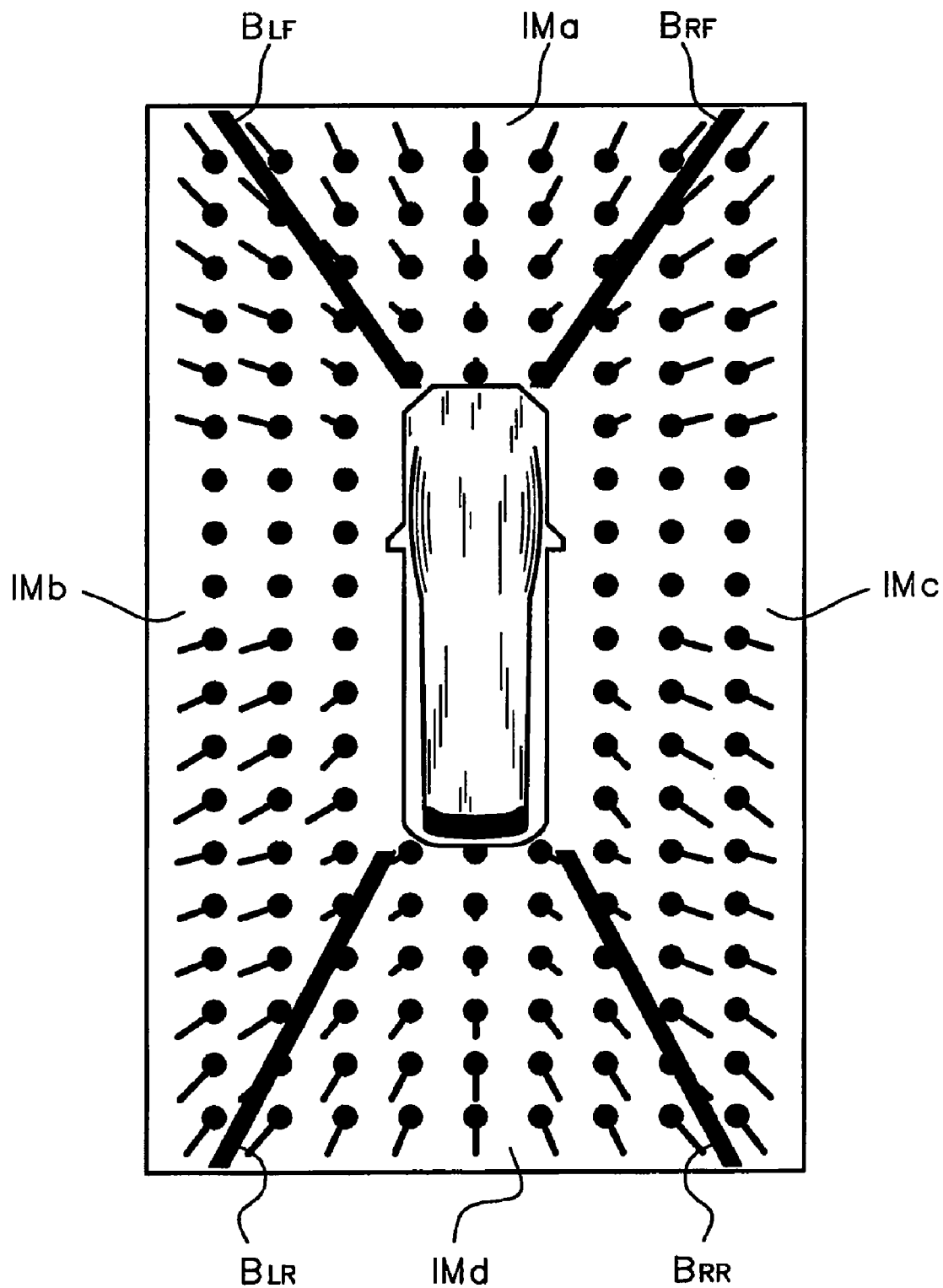
FIG. 1 is a diagram that schematically illustrates a specific embodiment of a plurality of displacement vectors for a plurality of points taken on images that are captured by a plurality of cameras when a load changes the attitude of a camera.
Figure 18A:
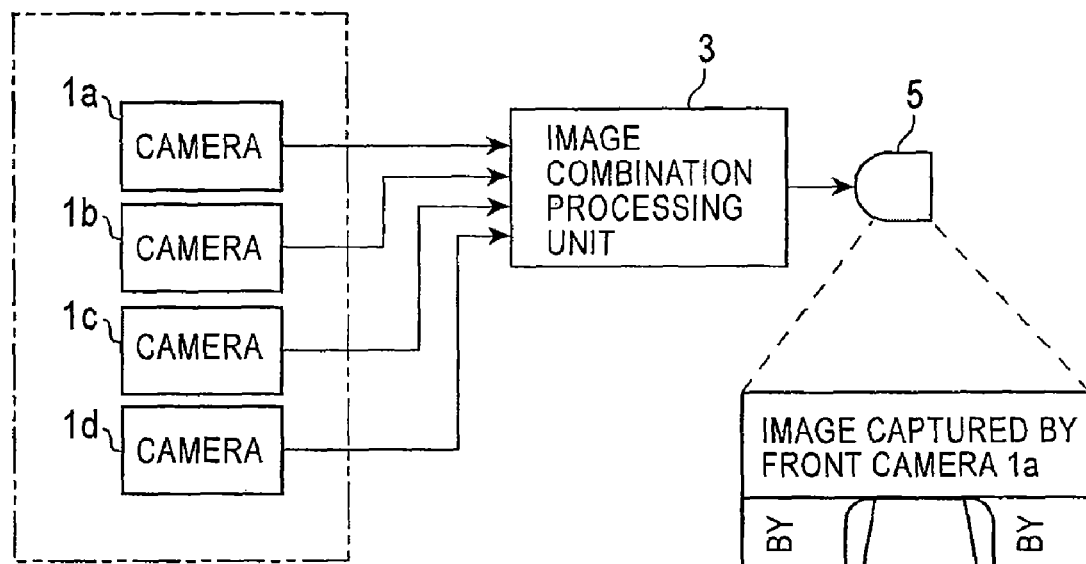
FIGS. 18A, 18B, and 18C schematically illustrate a top-view image display system.
Figure 18B:
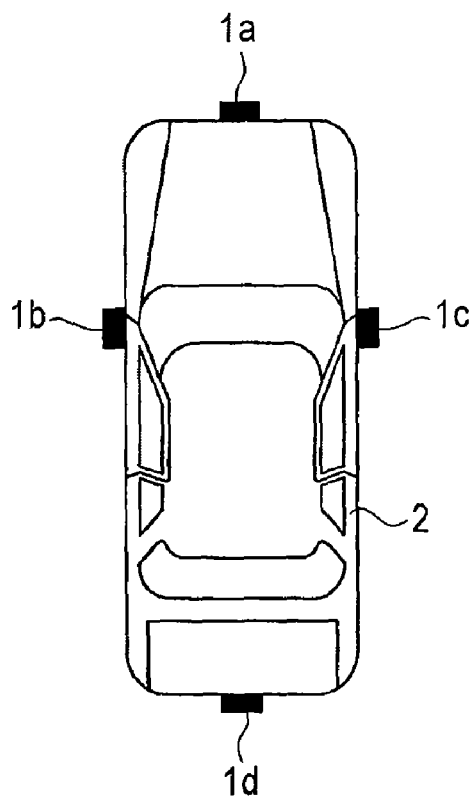
Figure 18C:
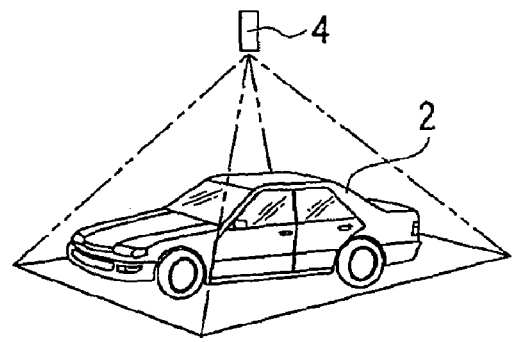
Figure 19:
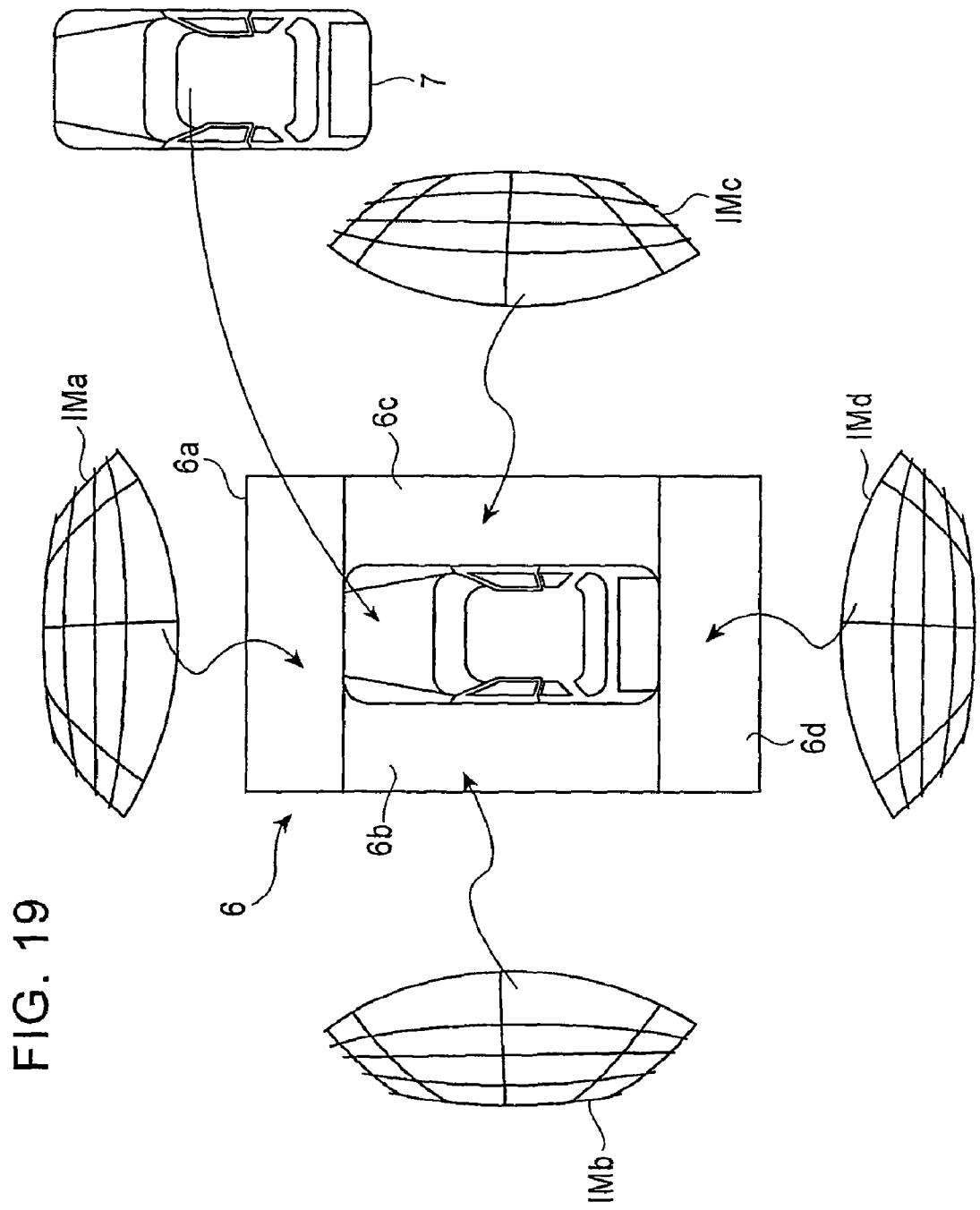
FIG. 19 schematically illustrates mapping of fish-eye images, which are captured with the use of a plurality of fish-eye cameras, onto a frame memory that corresponds to a display screen.
Figure 20A:
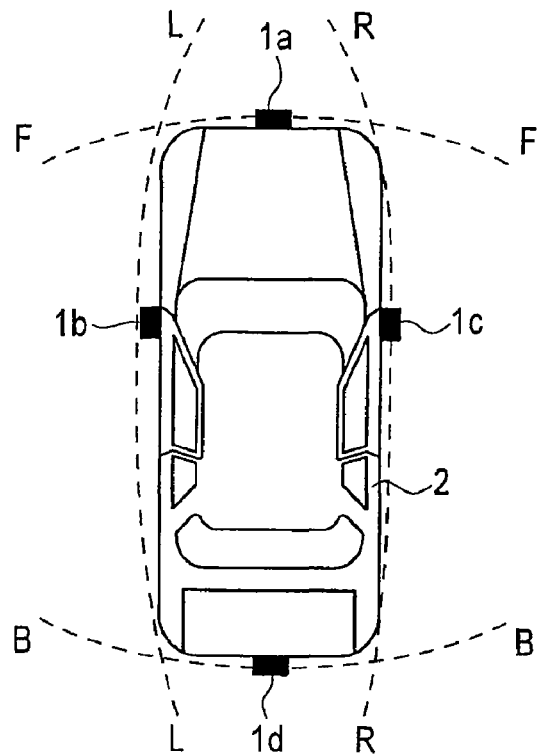
FIGS. 20A, 20B, and 20C schematically illustrate an example of a mapping method.
Figure 20B:
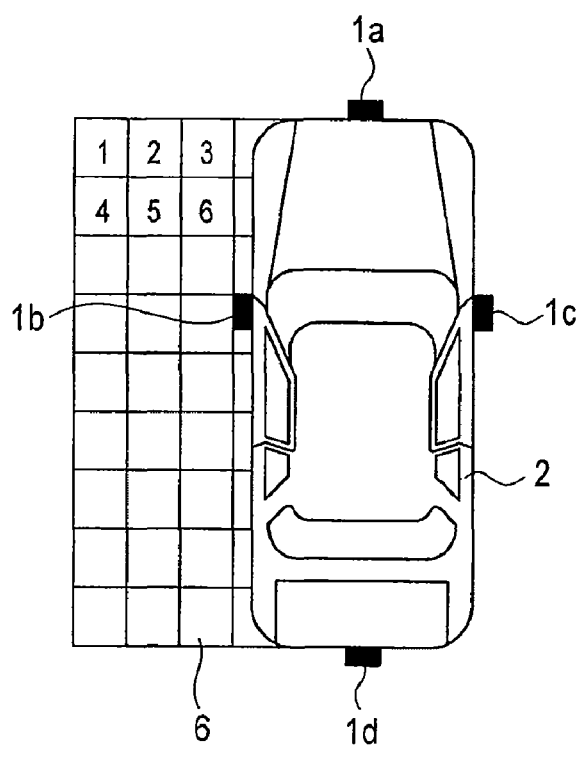
Figure 20C:
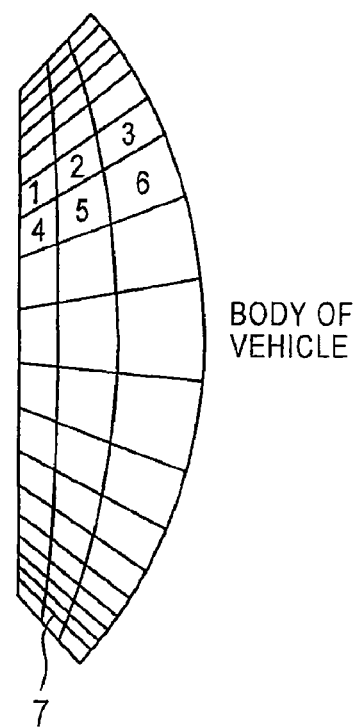
Figure 21A:
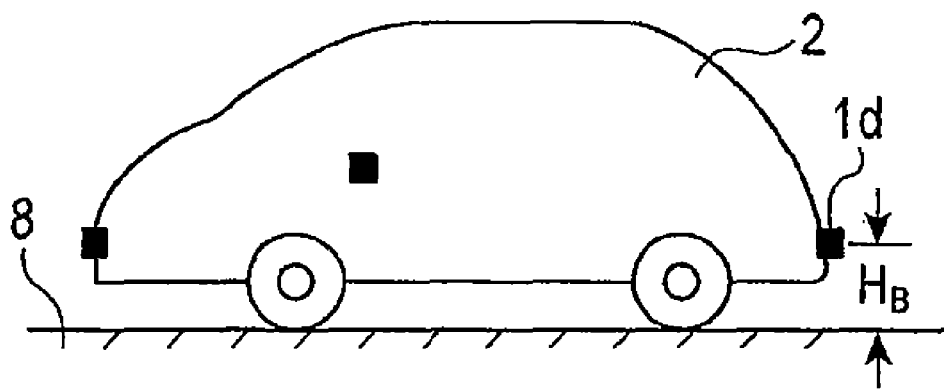
FIGS. 21A and 21B illustrate a change in the attitude of a camera.
Figure 21B:
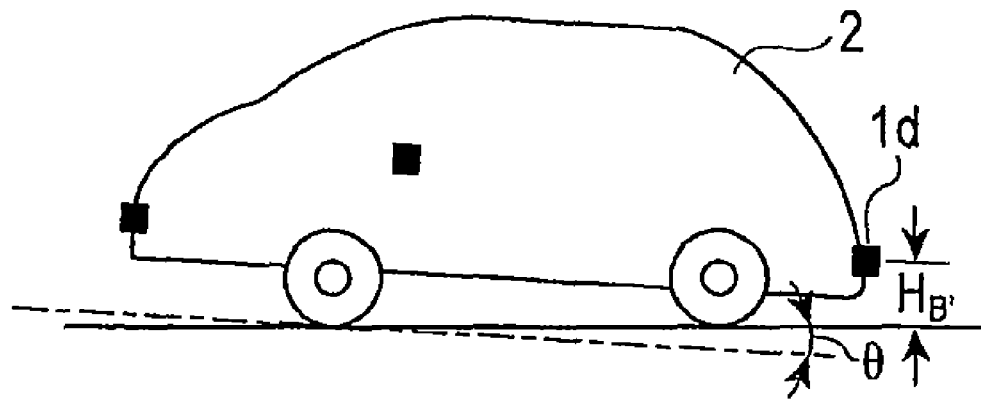
Figure 22:
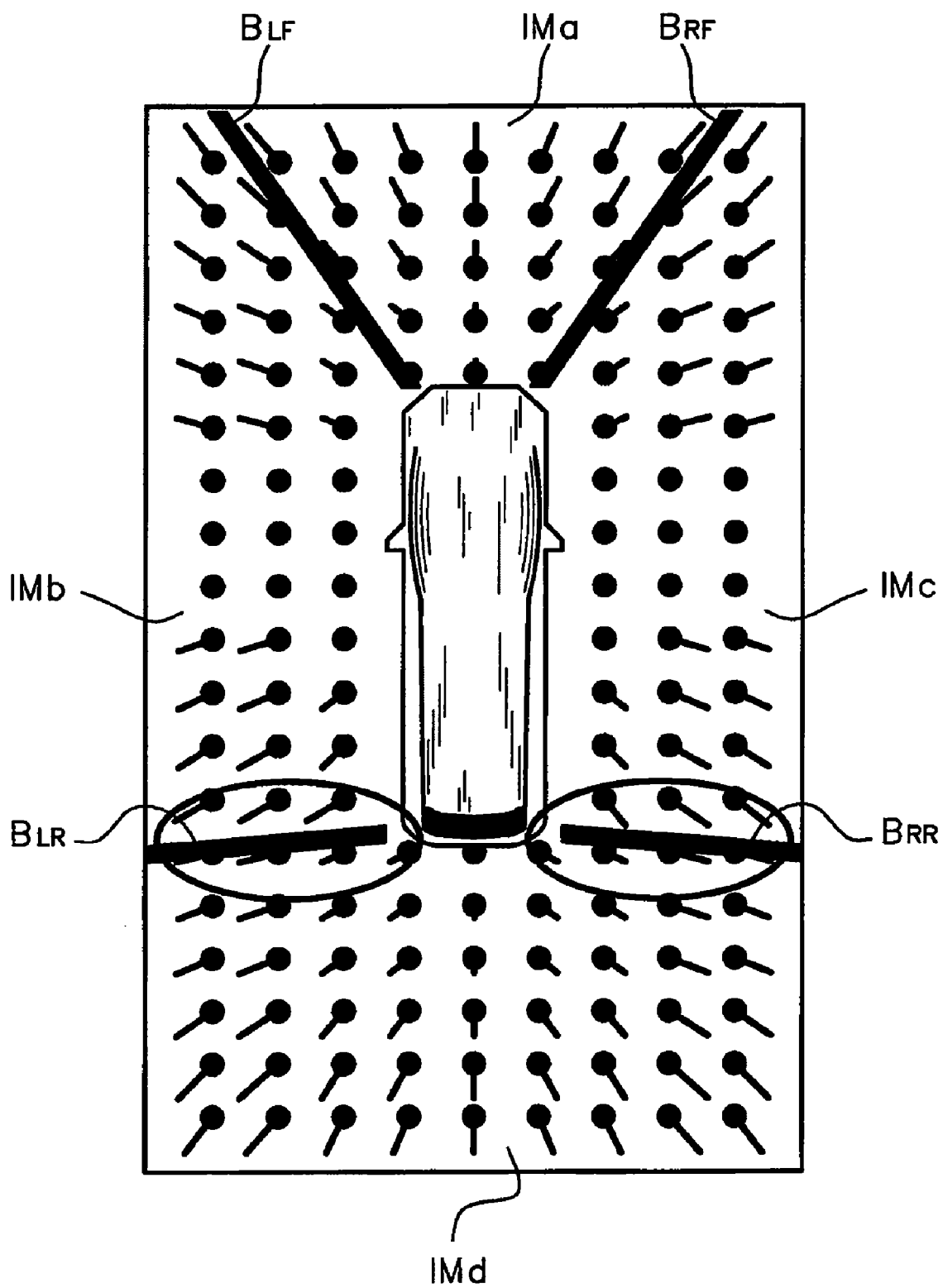
FIG. 22 illustrates a plurality of displacement vectors for a plurality of points taken on images that are captured by a plurality of cameras upon the application of a certain load that changes the attitude of a camera to a vehicle according to the related art.
Figure 23A:
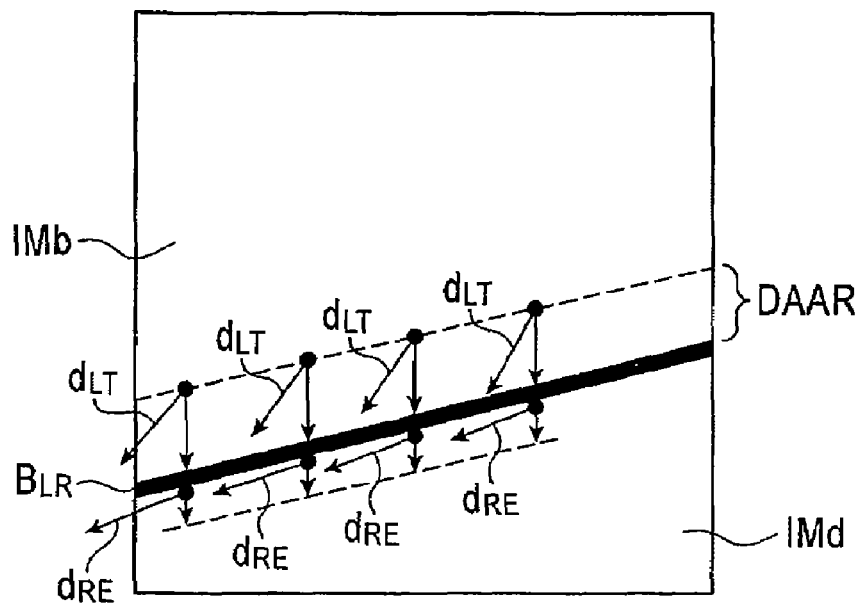
FIGS. 23A and 23B schematically illustrate the neighborhood of an image borderline.
Figure 23B:
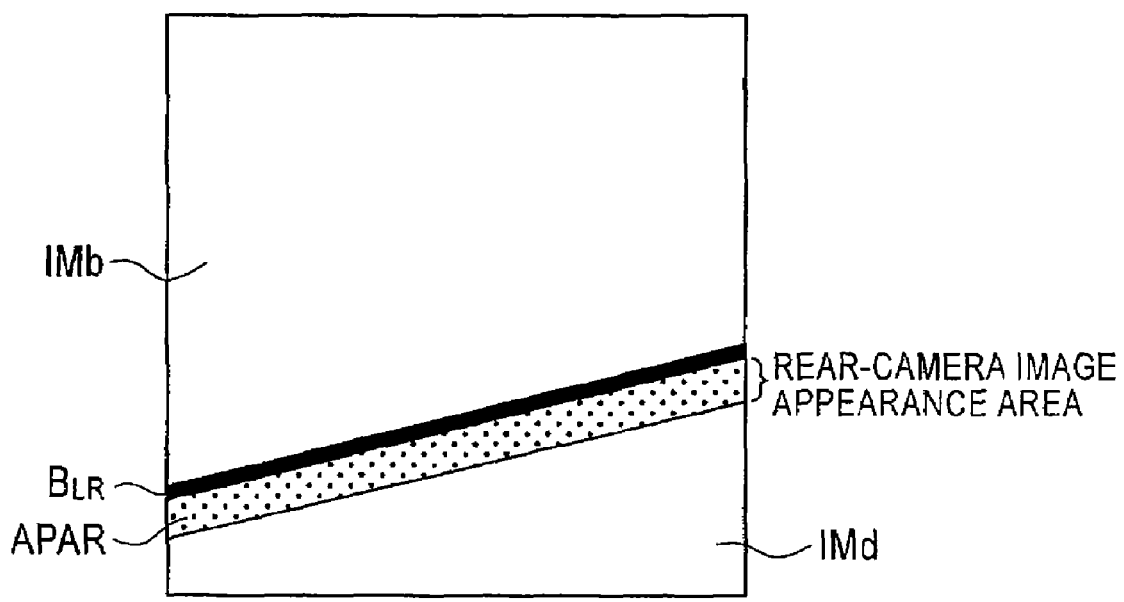
Figure 25:
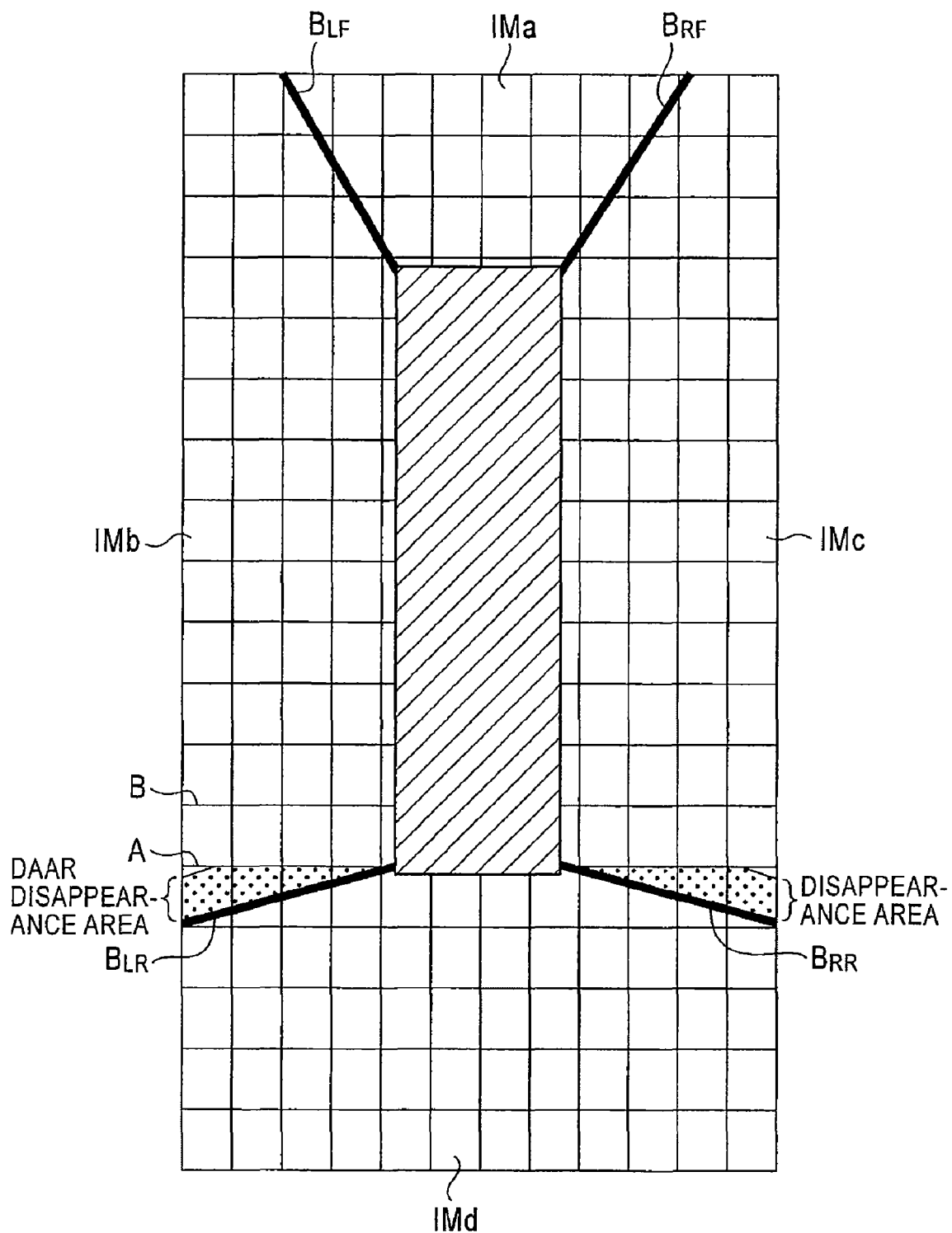
FIG. 25 schematically illustrates a top-view image formed before the occurrence of displacement according to the related art.
Figure 26:
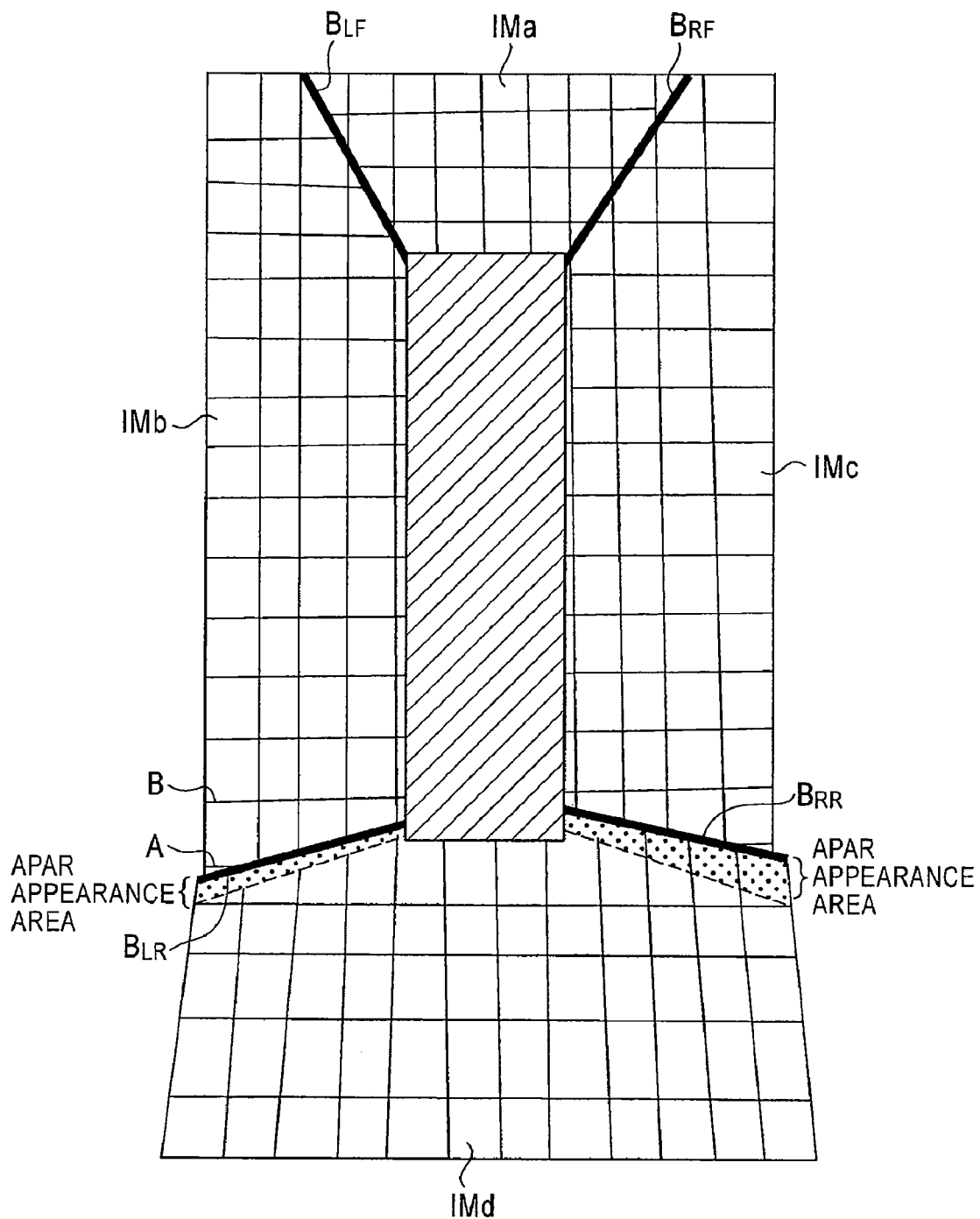
FIG. 26 schematically illustrates a top-view image formed after the occurrence of displacement according to the related art.

FIG. 1 schematically illustrates a plurality of displacement vectors for a plurality of points taken on the distortion-corrected fish-eye images IMa, IMb, IMc, and IMd, which are captured by the fish-eye lens cameras 1a, 1b, 1c, and 1d (FIG. 18B), respectively. The displacement vectors are generated as a result of the application of a certain load that changes the attitude of a camera on the vehicle, which is hereafter denoted as CAR. In this drawing, the position of each point is denoted by a black circle. Each short line segment that extends from the black circle indicates both the direction of a displacement vector, and the magnitude of the displacement vector.

In FIG. 1, the reference numeral BLR denotes an image borderline between the left image IMb and the rear image IMd. The reference numeral BLF denotes an image borderline between the left image IMb and the front image IMa. The reference numeral BRR denotes an image borderline between the right image IMc and the rear image IMd. Finally, the reference numeral BRF denotes an image borderline between the right image IMc and the front image IMa. As shown in FIG. 1, the directions of displacement vectors are substantially the same as each other in the neighborhood of each of the image borderlines BLR, BLF, BRR, and BRF between two adjacent images in a top-view image. In other words, in a top-view image, the directions of displacement vectors in a border area of one image are substantially the same as the directions of displacement vectors in the corresponding border area of another image that is adjacent to the above-mentioned image with an image borderline being formed therebetween.

Again, in other words, in a top-view image, a difference in the directions of displacement vectors in the neighborhood of the above-mentioned each image borderline between two adjacent images does not exceed a predetermined angle.

Figure 2:
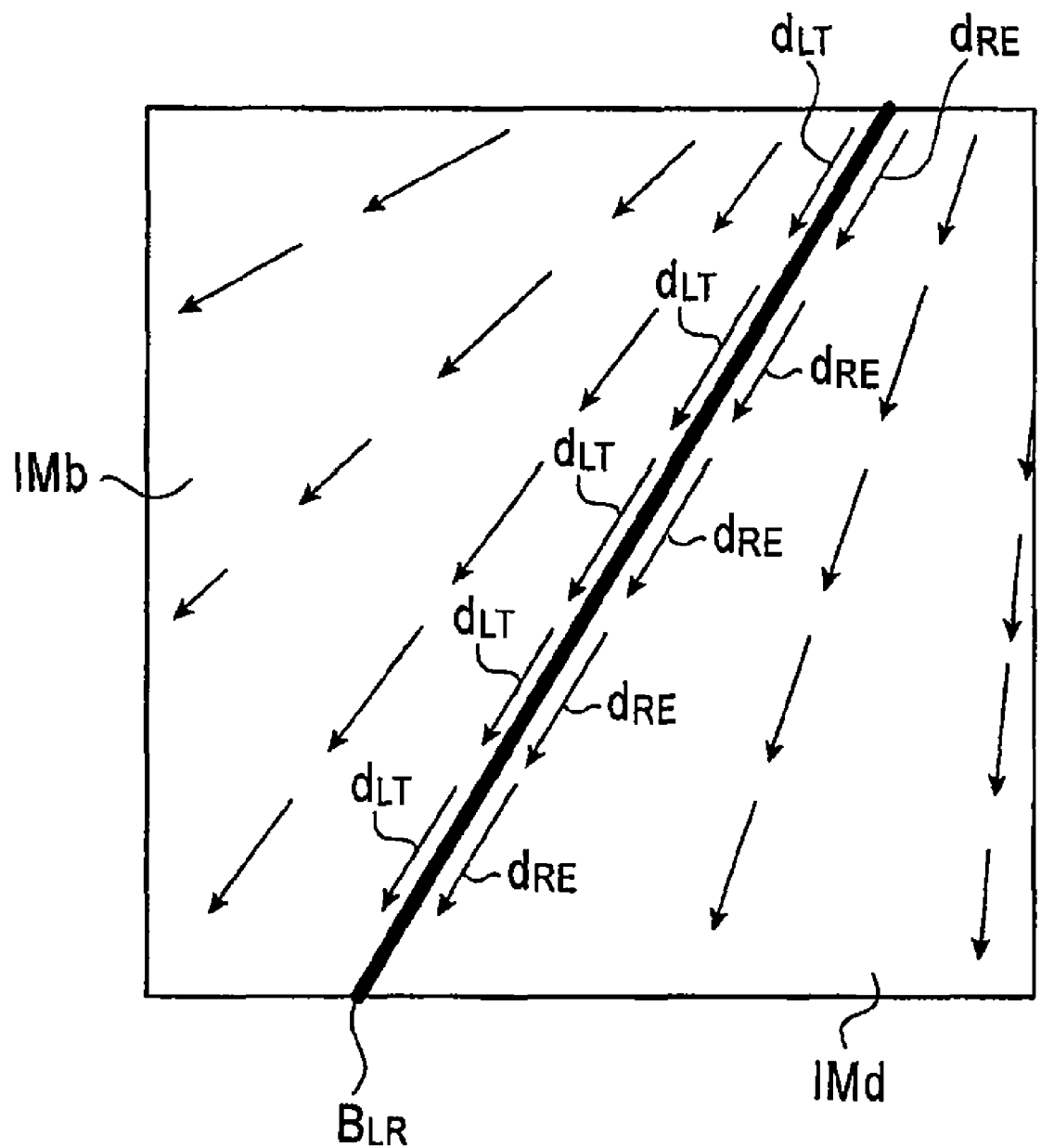
FIG. 2 is an enlarged view that schematically illustrates a specific embodiment of a border area of a left image and the corresponding border area of a rear image with an image borderline being formed therebetween.

FIG. 2 is an enlarged view that schematically illustrates a border area of the left image IMb, and the corresponding border area of the rear image IMd, with the image borderline BLR being formed therebetween. Each reference numeral dLT denotes a displacement vector that is generated from a point in the left image IMb in the neighborhood of the image borderline BLR when a certain load that changes the attitude of a camera is applied to the vehicle CAR. Each reference numeral dRE denotes a displacement vector that is generated from a point in the rear image IMd in the neighborhood of the image borderline BLR when a certain load that changes the attitude of a camera is applied to the vehicle CAR.

According to one embodiment, the direction of the displacement vector dLT is substantially the same as that of the displacement vector dRE. In addition, the magnitude of the displacement vector dLT is substantially the same as that of the displacement vector dRE. When a certain load that changes the attitude of, for example, the rear camera 1d is applied to the vehicle CAR, the left image IMb and the rear image IMd move in the directions indicated by the displacement vectors, dLT and dRE, and move according to the magnitudes thereof. Because the left image IMb and the rear image IMd move in the directions of the displacement vectors dLT and dRE, no part of an image disappears or appears because the direction of the displacement vector dLT as well as the magnitude thereof is substantially the same as that of the displacement vector dRE.

Therefore, it is possible to display a three-dimensional object in an accurate manner. If the magnitude of the displacement vector dLT differs from that of the displacement vector dRE, the left image IMb and the rear image IMd are shifted from each other by a difference in the magnitudes therebetween. However, no part of an image disappears or appears, because the direction of the displacement vector dLT is substantially the same as that of the displacement vector dRE. Therefore, ideally, each of the image borderlines BLR, BLF, BRR, and BRF between two adjacent images should be determined in such a manner such that both the direction of the displacement vector dLT and the magnitude thereof are the same as those of the displacement vector dRE.

Figure 3B:
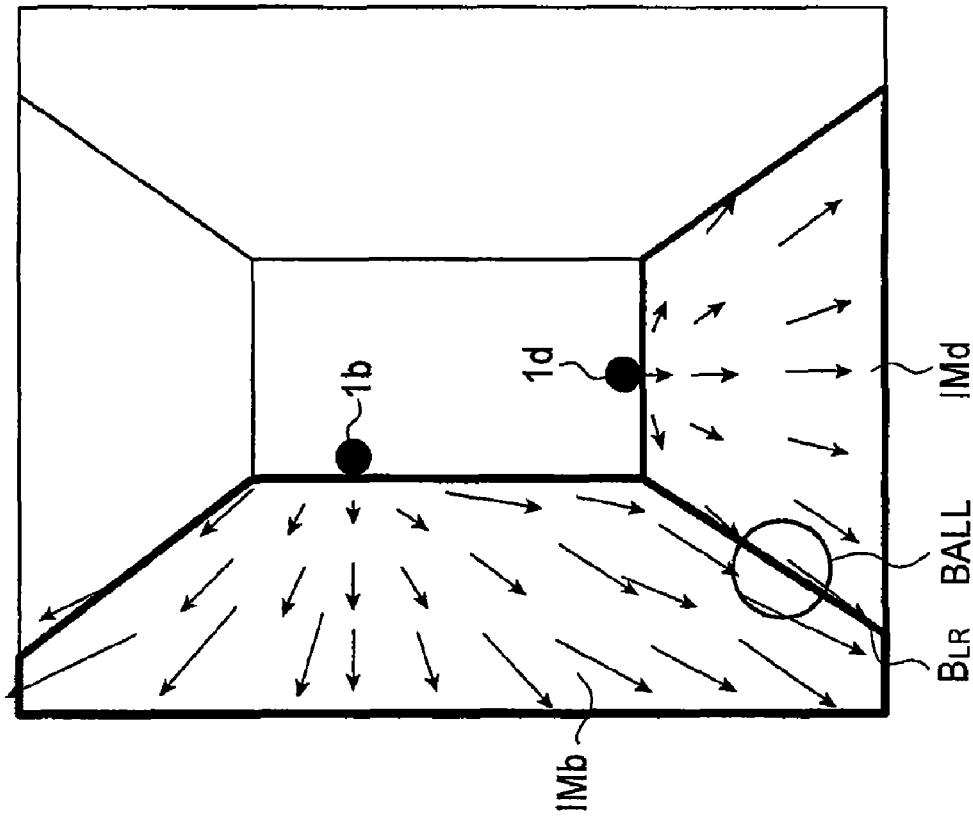
FIGS. 3A and 3B are a set of diagrams that schematically illustrates the effects of a change in the attitude of a camera in a combined image according to an exemplary embodiment of the invention.
Figure 3A:
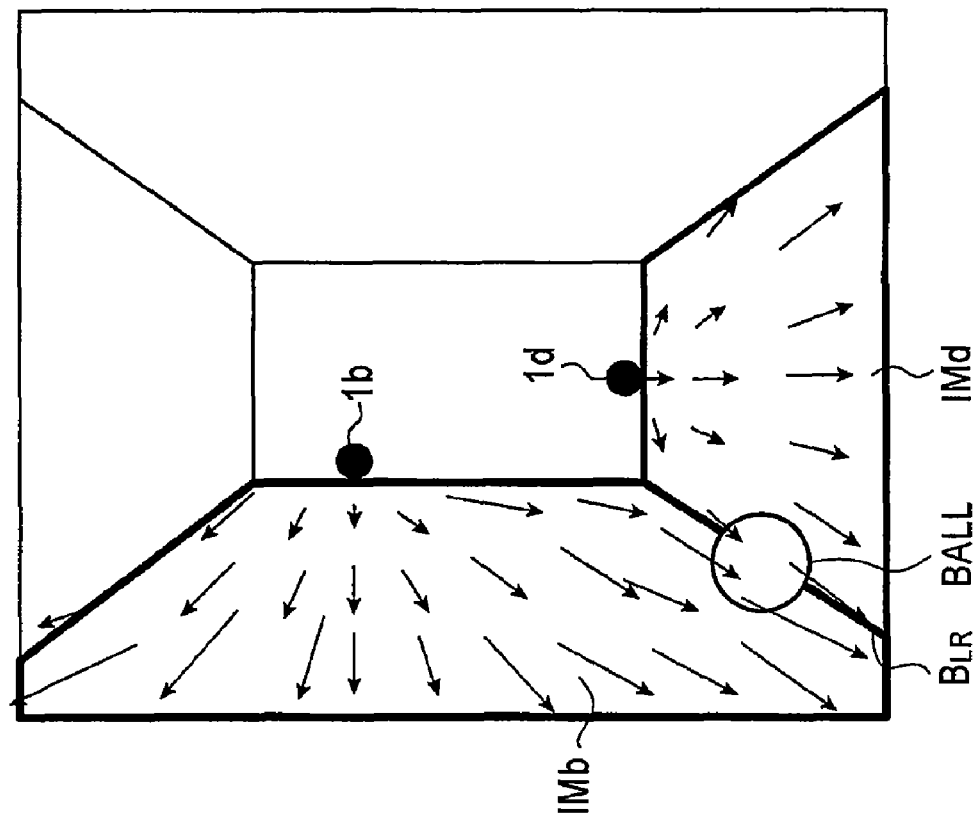

FIGS. 3A and 3B schematically illustrate the effects of a change in the attitude of a camera in a combined image. FIG. 3A shows a left-rear part of a combined image that is composed of the left image IMb and the rear image IMd before the occurrence of a change in the attitude of a camera. FIG. 3B shows the left-rear part of a combined image that is composed of the left image IMb and the rear image IMd after the occurrence of a change in the attitude of a camera.

Before the occurrence of a camera attitude change, a ball (BALL) that lies in the neighborhood of the image borderline BLR is displayed as a circle in a faithful manner. In addition, the ball is displayed as a circle in a faithful manner even after the occurrence of a camera attitude change. Note that the position of the ball has been slightly shifted in the displacement direction after the occurrence of a change in the attitude of a camera.

Figure 4:
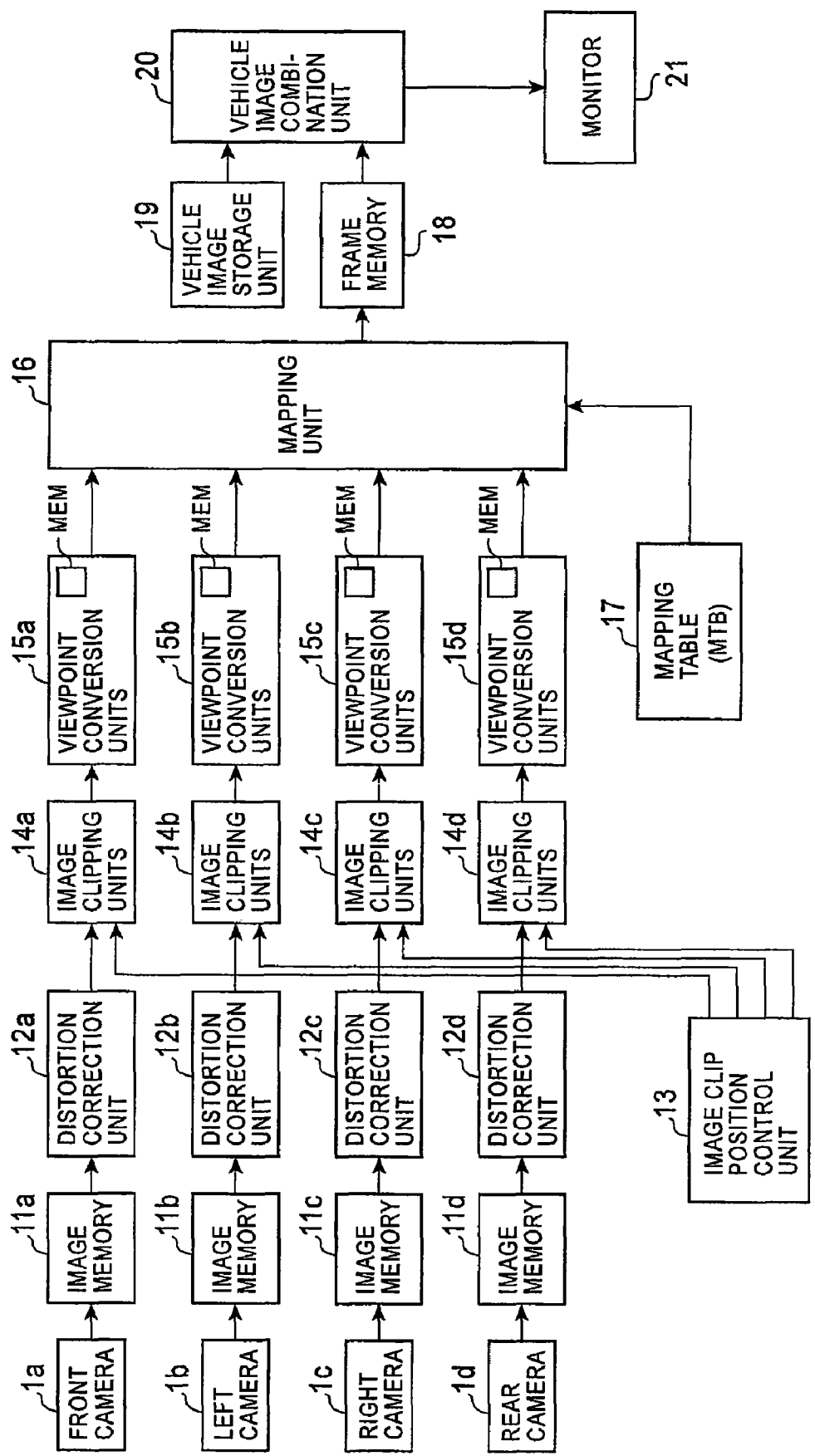
FIG. 4 is a block diagram that schematically illustrates a specific embodiment of an image display apparatus that displays a top-view image.

FIG. 4 is a block diagram that schematically illustrates the configuration of an image display apparatus that displays a top-view image according a specific embodiment of the invention. A top-view image display apparatus has a plurality of fish-eye lens cameras 1a, 1b, 1c, and 1d (refer to FIG. 18B), each of which captures an image at the corresponding peripheral area around a vehicle CAR. The fish-eye lens camera 1a is mounted at the front of the vehicle CAR, the fish-eye lens camera 1d is mounted at the rear thereof, the fish-eye lens camera 1b is mounted at the left side of the vehicle CAR, and the fish-eye lens camera 1c is mounted at the right side thereof.

Figure 5:
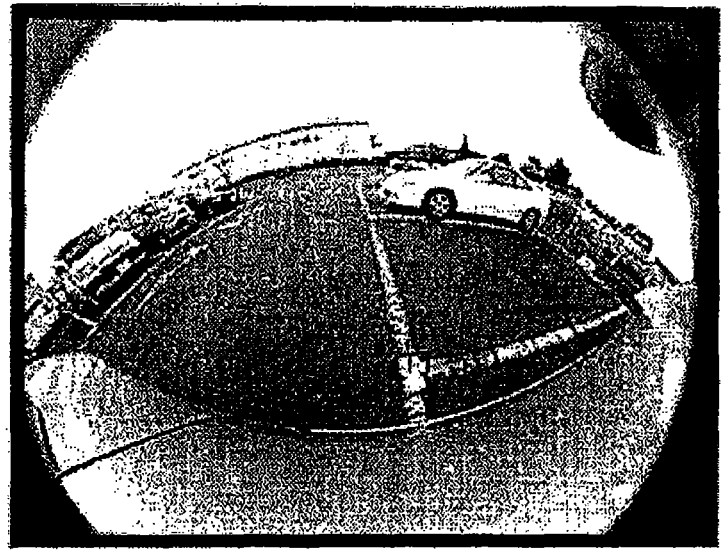
FIG. 5 is a diagram that schematically illustrates a fish-eye image.

The image of a peripheral area taken by each of the plurality of fish-eye lens cameras 1a, 1b, 1c, and 1d is stored in the corresponding image memories 11a, 11b, 11c, and 11d. Each of a plurality of distortion-correcting units 12a, 12b, 12c, and 12d corrects a distorted fish-eye image that is photographed by the corresponding fish-eye lens cameras 1a, 1b, 1c, and 1d. After the distortion correction, each image is stored in a memory of the distortion correction unit. FIG. 5 schematically illustrates a fish-eye image. Each distortion correction unit 12a-12d corrects the distorted portions of a fish-eye image in such a manner that curves are corrected and become straight lines.

Figure 6:
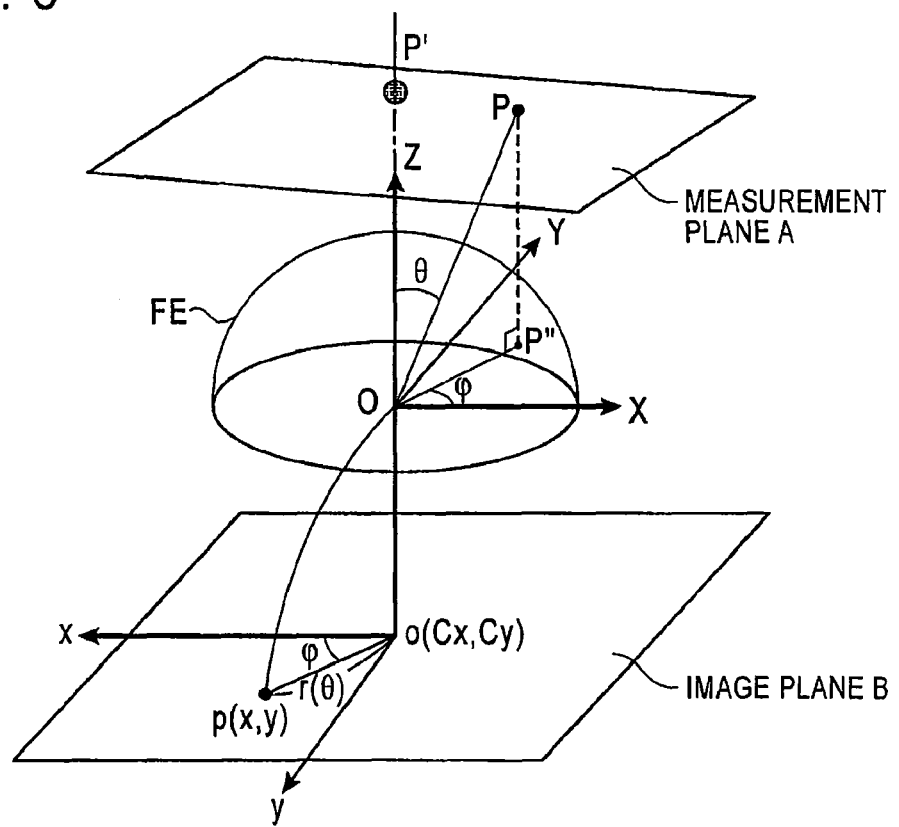
FIG. 6 is a diagram that schematically illustrates a fish-eye lens camera.

FIG. 6 schematically illustrates a fish-eye lens camera. The fish-eye camera is provided with a fish-eye lens FE. The fish-eye lens FE has a three-dimensional fish-eye coordinate system that includes of X, Y, and Z axes. The Z axis of the fish-eye coordinate system X-Y-Z is defined as an optical axis. An image plane B that has a two-dimensional coordinate system x-y is formed in a planar direction perpendicular to the optical axis Z. The origin of the image plane B having the two-dimensional coordinate system x-y is denoted as "o" in the drawing. The origin "o" of the image plane B is expressed as (Cx, Cy) in the two-dimensional coordinate system x-y. A point of measurement P on a measurement plane A is acquired as a point "p" on the image plane B through the fish-eye lens FE. The point p is expressed as (x, y) in the two-dimensional coordinate system x-y. It is assumed that the measurement point P is projected on the X-Y plane of the fish-eye coordinate system X-Y-Z. The projected point on the X-Y plane is denoted as "P." An angle formed by the X axis of the fish-eye coordinate system X-Y-Z, and a straight line that passes through the projected point P" and the origin O of the fish-eye coordinate system X-Y-Z, is denoted as φ. An angle formed by the optical axis Z and the direction of incident light is denoted as θ. According to these definitions, an angle formed on the x-y image plane by a line segment "op" and the x axis, is expressed as φ. In addition, the length of the line segment op is expressed as r(θ). This value r(θ), which is the distance between the point p and the origin o on the x-y image plane, signifies a distortion aberration. The distortion aberration r(θ) is calculated using the following formula (1).

$$r(\theta) = 2f\tan(\theta/2) \approx k_1\theta + k_3\theta^3 + k_5\theta^5 \qquad (1)$$

Note that the mathematical formula (1) shown above may be modified depending on the optical design of the lens. The coordinate value of the point p (x, y) of a fish-eye image on the image plane B is calculated using the following formula (2) on the basis of the calculated distortion aberration r(θ).

$$\begin{pmatrix} x \\ y \end{pmatrix} = r(\theta)\begin{pmatrix} \cos\varphi \\ \sin\varphi \end{pmatrix} \qquad (2)$$

Each of the distortion correction units 12a-12d performs distortion correction. Herein, the amount of distortion correction is denoted as DX, DY, which is calculated using the following formula (3).

$$DX = \{k_1\theta + k_3\theta^3 + k_5\theta^5\}\frac{x}{\sqrt{x^2+y^2}} + C_x \quad (3)$$

$$DY = \{k_1\theta + k_3\theta^3 + k_5\theta^5\}\frac{y}{\sqrt{x^2+y^2}} + C_y$$

Upon the application of a certain load that changes the attitude of a camera to the vehicle CAR, an image clip position control unit (i.e., image cut position control unit) 13 performs the following processing (1)-(4). (1) The image clip position control unit 13 calculates the amount of change in the attitude of each camera. (2) The image clip position control unit 13 calculates, on the basis of the calculated amount of camera attitude change, a plurality of displacement vectors for a plurality of points taken on images that are captured by the cameras (refer to FIG. 1). (3) The image clip position control unit 13 determines each of the image borderlines $B_{LR}$, $B_{LF}$, $B_{RR}$, and $B_{RF}$ between two adjacent images in such a manner that a difference in the directions of displacement vectors in the neighborhood of the above-mentioned each image borderline between two adjacent images does not exceed a predetermined angle. (4) The image clip position control unit 13 sets each image portion that is demarcated by two image borderlines, that is, each image portion that lies between two image borderlines, as an image clip area portion (i.e., positions), and then outputs each image clip area portion (i.e., each image clip area) as a control instruction to the corresponding one of a plurality of image clipping units 14a, 14b, 14c, and 14d.

Figure 7:
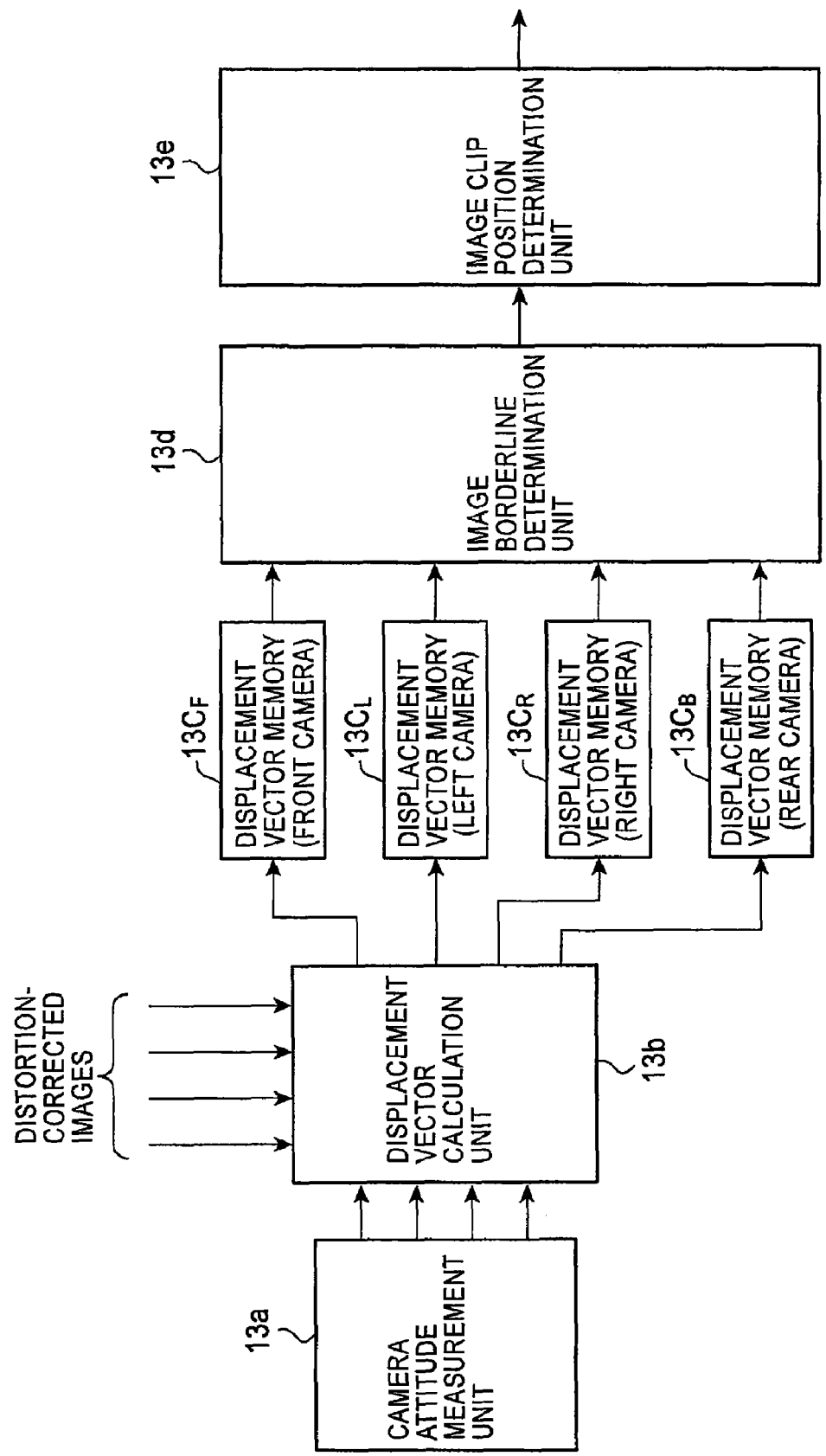
FIG. 7 is a block diagram that schematically illustrates an image clip position control unit according to an exemplary embodiment of the invention.

FIG. 7 is a block diagram that schematically illustrates the configuration of the image clip position control unit 13 according to an exemplary embodiment of the invention. A camera attitude measurement unit 13a measures the amount of change in a set of variables that identifies the attitude of a camera. The camera position measurement unit 13a performs such measurement for each camera. The set of variables that identifies the attitude of a camera includes the shift amount of the camera in a reference coordinate system, and the rotation amount thereof around each axis of the reference coordinate system.

For example, if a three-dimensional coordinate system Xr-Yr-Zr whose origin is taken at the above-mentioned virtual point of view is considered, the set of variables that identifies the attitude of the camera includes the shift amount x, y, z in the reference coordinate system Xr-Yr-Zr and the rotation amount rx, ry, rz around each axis of the reference coordinate system Xr-Yr-Zr. More specifically, a calibration figure is photographed with the use of a camera both before a change in the attitude thereof and after a change in the attitude thereof. The camera attitude measurement unit 13a performs software processing on the photographed calibration figure. In this way, the camera position measurement unit 13a calculates the amount of attitude change $\Delta tx$, $\Delta ty$, $\Delta tz$, $\Delta rx$, $\Delta ry$, and $\Delta rz$ for each camera.

The displacement vector calculation unit 13b calculates displacement component $\Delta U$, $\Delta V$ for each camera on the basis of the calculated amount of change in attitude $\Delta tx$, $\Delta ty$, $\Delta tz$, $\Delta rx$, $\Delta ry$, and $\Delta rz$. The displacement component $\Delta U$, $\Delta V$ is calculated using the following formula (4).

$$\begin{bmatrix}\Delta U \\ \Delta V \\ 1\end{bmatrix} \cong \begin{pmatrix}\cos(\Delta rz) & -\sin(\Delta rz) & 0 \\ \sin(\Delta rz) & \cos(\Delta rz) & 0 \\ 0 & 0 & 1\end{pmatrix} \times \begin{pmatrix}\cos(\Delta ry) & 0 & \sin(\Delta ry) \\ 0 & 1 & 0 \\ -\sin(\Delta ry) & 0 & \cos(\Delta ry)\end{pmatrix} \times \quad (4)$$

-continued $$\begin{pmatrix}1 & 0 & 0 \\ 0 & \cos(\Delta rx) & -\sin(\Delta rx) \\ 0 & \sin(\Delta rx) & \cos(\Delta rx)\end{pmatrix} \times \begin{pmatrix}x \\ y \\ z\end{pmatrix} + \begin{pmatrix}\Delta tx \\ \Delta ty \\ \Delta tz\end{pmatrix}$$

Accordingly, the displacement vector calculation unit 13b calculates, while using the above mathematical formula (4), a plurality of displacement vectors for a plurality of points taken on images that are captured by the cameras 1a-1d after the correction of distortion. Then, the displacement vector calculation unit 13b stores the calculated displacement vectors into a plurality of displacement vector memories $13c_F$, $13c_L$, $13c_R$, and $13c_B$, which correspond to cameras 1a, 1b, 1c and 1d, respectively.

Alternatively, the displacement vector calculation unit 13b may calculate a displacement vector for a certain point by drawing a line that passes through the above-mentioned point in a top-view image before the occurrence of a change in the attitude of a camera, and which further passes through the point (i.e., the same point) in a top-view image after the occurrence of a change in the attitude of a camera. In such a configuration, the displacement vector calculation unit 13b calculates a displacement vector for each point on the image in the same manner as described above.

An image borderline determination unit 13d finds a point(s) in such a manner that a difference in the directions of displacement vectors between two adjacent images, which are captured by two adjacent cameras, does not exceed a predetermined angle. Then, the image borderline determination unit 13d determines each of the image borderlines BLR, BLF, BRR, and BRF (refer to FIG. 1) on the corresponding point.

For example, the image borderline determination unit 13d finds a point in such a manner that a difference in the directions of displacement vectors between two adjacent images, which are captured by two adjacent cameras, does not exceed a predetermined angle. The image borderline determination unit 13d then determines each of the image borderlines BLR, BLF, BRR, and BRF in such a manner that the image borderline passes through the point and extends in the same direction as that of the displacement vector.

Alternatively, the image borderline determination unit 13d may find a plurality of points in such a manner that differences in the directions of displacement vectors between two adjacent images, which are captured by two adjacent cameras, do not exceed a predetermined angle, and then determine each of the image borderlines BLR, BLF, BRR, and BRF in such a manner that the image borderline passes through these points.

Figure 8:
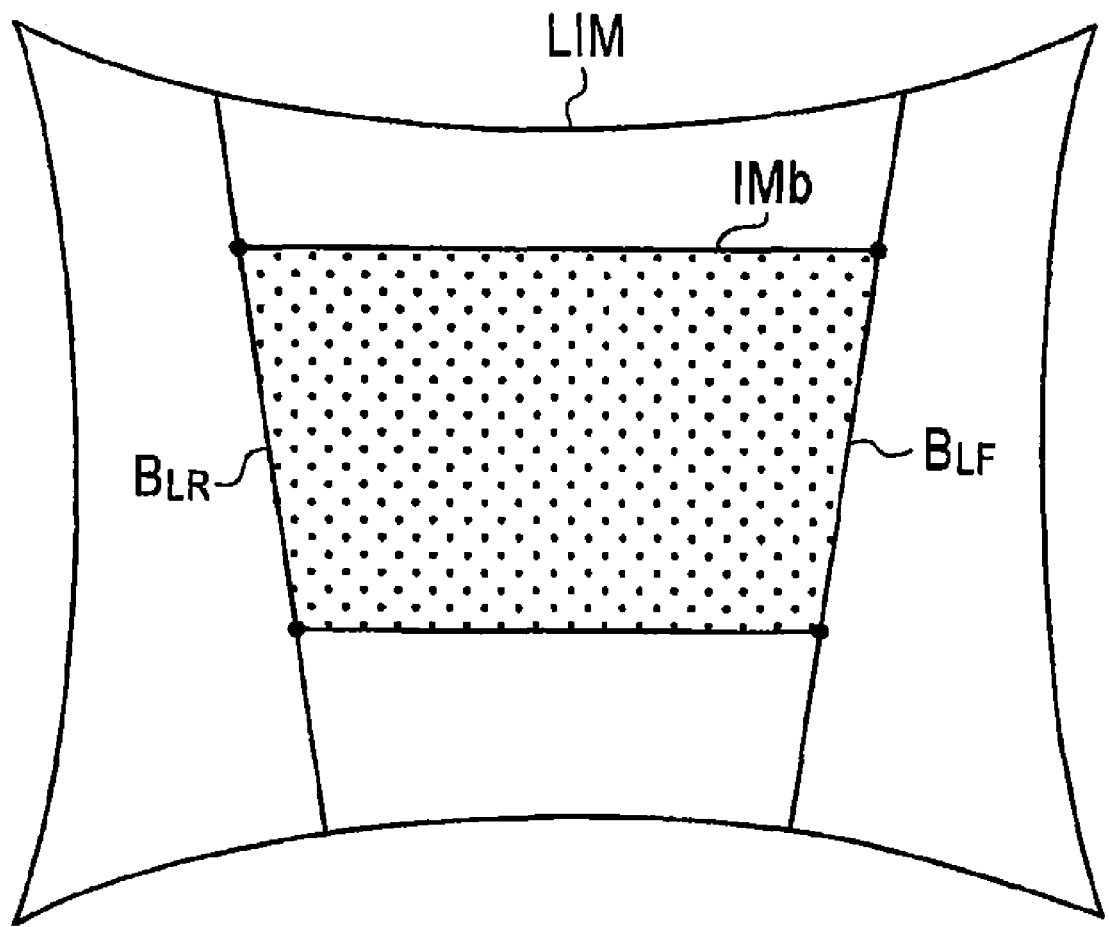
FIG. 8 is a diagram that schematically illustrates the clipping of an image portion that is demarcated by two image borderlines out of a distortion-corrected left image as an image clip area according to an exemplary embodiment of the invention.

An image clip area determination unit (i.e., image clip position determination unit) 13e sets each image portion that is demarcated by two image borderlines, that is, each image portion that lies between two image borderlines (L) BLR and BLF, (F) BLF and BRF, (R) BRF and BRR, and (B) BRR and BLR, as an image clip area portion, and then outputs each image clip area portion as a control instruction to the corresponding one of the plurality of image clipping units 14a, 14b, 14c, and 14d. For example, as shown in FIG. 8, the image clip area determination unit 13e sets the aforementioned image portion IMb, which lies between two image borderlines BLR and BLF, as an image clip area portion out of a distortion-corrected left image LIM, and then outputs the image clip area portion as a control instruction to the corresponding image clipping unit 14b.

Figure 9:
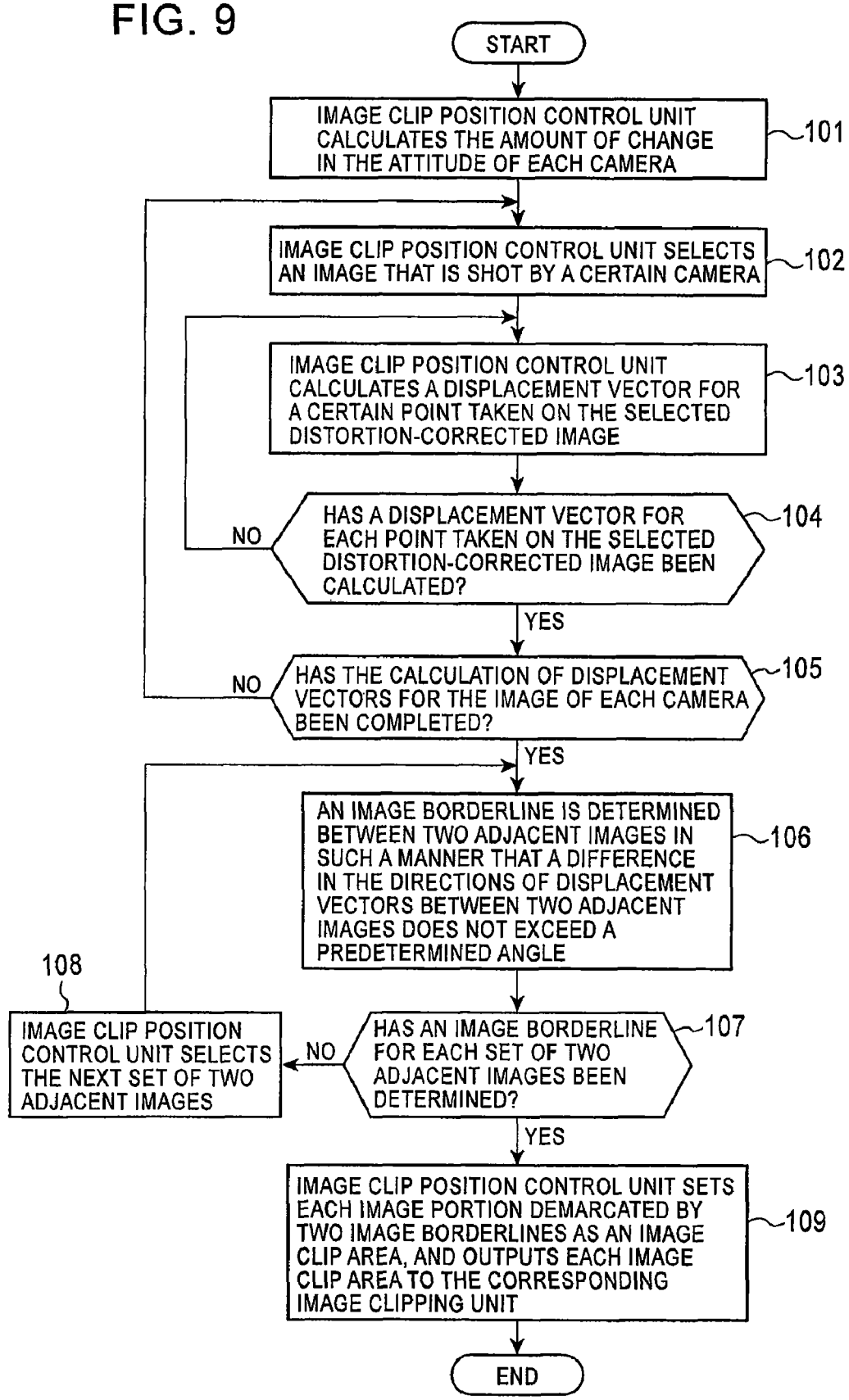
FIG. 9 is a flowchart that schematically illustrates the procedures of image clip position determination, which are executed by the image clip position control unit according to an exemplary embodiment of the invention.

FIG. 9 is a flowchart that schematically illustrates the procedures of image clip position determination, which are executed by the image clip position control unit 13. When a certain load changes the attitude of a camera is applied to the vehicle CAR, the image clip position control unit 13 calculates the amount of change in the attitude of each camera (step S101), and then selects an image that is captured by a certain camera (step S102). Then, the image clip position control unit 13 calculates, on the basis of the calculated amount of camera attitude change, a displacement vector for a certain point taken on the selected distortion-corrected image (i.e., image obtained after distortion correction) that is captured by the camera (step S103).

Next, the image clip position control unit 13 determines whether a displacement vector for each point taken on the selected distortion-corrected image has been calculated or not (step S104). If it is determined that a displacement vector has not been calculated yet (step S104: NO), the process branches to the preceding step S103. If it is determined that a displacement vector has been calculated (step S104: YES), the process proceeds to the next step S105.

In the step S105, the image clip position control unit 13 determines whether the calculation of displacement vectors for the image of each camera has been completed or not. If the calculation has not been completed (step S105: NO), the process returns to the previous step S102. That is, the next camera is selected for the same procedures as explained above.

If it is determined that the calculation of displacement vectors for the image of each camera has been completed (step S105: YES), the image clip position control unit 13 then determines an image borderline between two adjacent images in such a manner that a difference in the directions of displacement vectors in the neighborhood of the image borderline does not exceed a predetermined angle (step S106). It is desirable to make the difference in the directions of displacement vectors as small as possible, preferable, about 0°.

Next, the image clip position control unit 13 determines whether an image borderline for each set of two adjacent images has been determined or not (step S107). If it is judged that an image borderline has not been determined yet (step S107: NO), the image clip position control unit 13 selects the next set of two adjacent images (step S108), and then repeats the steps S106 and S107.

If it is determined that an image borderline has been determined (step S107: YES), the image clip position control unit 13 sets each image portion that is demarcated by two image borderlines, that is, each image portion that lies between two image borderlines, as an image clip area portion (i.e., positions), and then outputs each image clip area portion as a control instruction to the corresponding image clipping unit 14a, 14b, 14c, and 14d (step S109).

Each of the image clipping units 14a-14d (FIG. 4) cuts an image clip area portion, which is specified by the image clip position control unit 13, out of a distortion-corrected image, which is stored in the memory of the corresponding distortion correction unit 12a-12d. Thereafter, each of the plurality of image clipping units 14a-14d outputs the clipped image area portion to the corresponding viewpoint conversion units 15a-15d.

If the camera image plane B shown in FIG. 6 and the measurement plane A are parallel to each other, it is not necessary to perform observing point conversion. However, in actual measurement, the camera image plane B and the measurement plane A are seldom parallel to each other. For this reason, it is necessary for the viewpoint conversion units 15a-15d to perform viewpoint conversion. The viewpoint conversion units 15a-15d perform viewpoint conversion to generate a top-view image out of the clipped distortion-corrected image portions by using the camera mount information and virtual viewpoint information.

A set of differences between the values of camera mount information (X1, Y1, Z1, Rx1, Ry1, Rz1) and the values of virtual viewpoint information (X2, Y2, Z2, Rx2, Ry2, Rz2) are denoted as (tx, ty, tz, trx, try, trz). The viewpoint conversion units 15a-15d perform viewpoint conversion using the following formula (5). Then, each of the viewpoint conversion units 15a-15d stores the result of viewpoint conversion into the corresponding memory MEM.

$$\begin{pmatrix} U \\ V \\ 1 \end{pmatrix} \cong \begin{pmatrix} \cos(rz) & -\sin(rz) & 0 \\ \sin(rz) & \cos(rz) & 0 \\ 0 & 0 & 1 \end{pmatrix} \begin{pmatrix} \cos(ry) & 0 & \sin(ry) \\ 0 & 1 & 0 \\ -\sin(ry) & 0 & \cos(ry) \end{pmatrix} \quad (5)$$

$$\begin{pmatrix} 1 & 0 & 0 \\ 0 & \cos(rx) & -\sin(rx) \\ 0 & \sin(rx) & \cos(rx) \end{pmatrix} \times \begin{pmatrix} X1 \\ Y1 \\ Z1 \end{pmatrix} + \begin{pmatrix} X2 \\ Y2 \\ Z2 \end{pmatrix}$$

A mapping unit 16 reads viewpoint-converted image data from each of the image memories MEM, and then performs mapping with the use of a mapping table MTB. In this way, the mapping unit 16 stores the image data into a frame memory 18. A mapping-table storage unit 17 memorizes the mapping table MTB, which is used for mapping the viewpoint-converted image stored in each image memory MEM onto the frame memory 18 corresponding to a display screen.

The mapping unit 16 performs raster scanning on the mapping table MTB so as to sequentially read out a predetermined image memory MEM, as well as the address thereof, on a pixel-by-pixel basis. Then, the mapping unit 16 reads the viewpoint-converted image data from the address of the image memory MEM and then writes the read image data into the frame memory 18. The same writing operation as explained above is performed for each pixel. In this way, image data of peripheral areas around the vehicle CAR are mapped onto the frame memory 18.

A vehicle image storage unit 19 memorizes a pre-captured vehicle image. A vehicle image combination unit 20 combines the pre-captured vehicle image and the image data of peripheral areas around the vehicle CAR, which is mapped on the frame memory 18. The vehicle image combination unit 20 then outputs a combined image to a monitor 21 for display.

Figure 10:
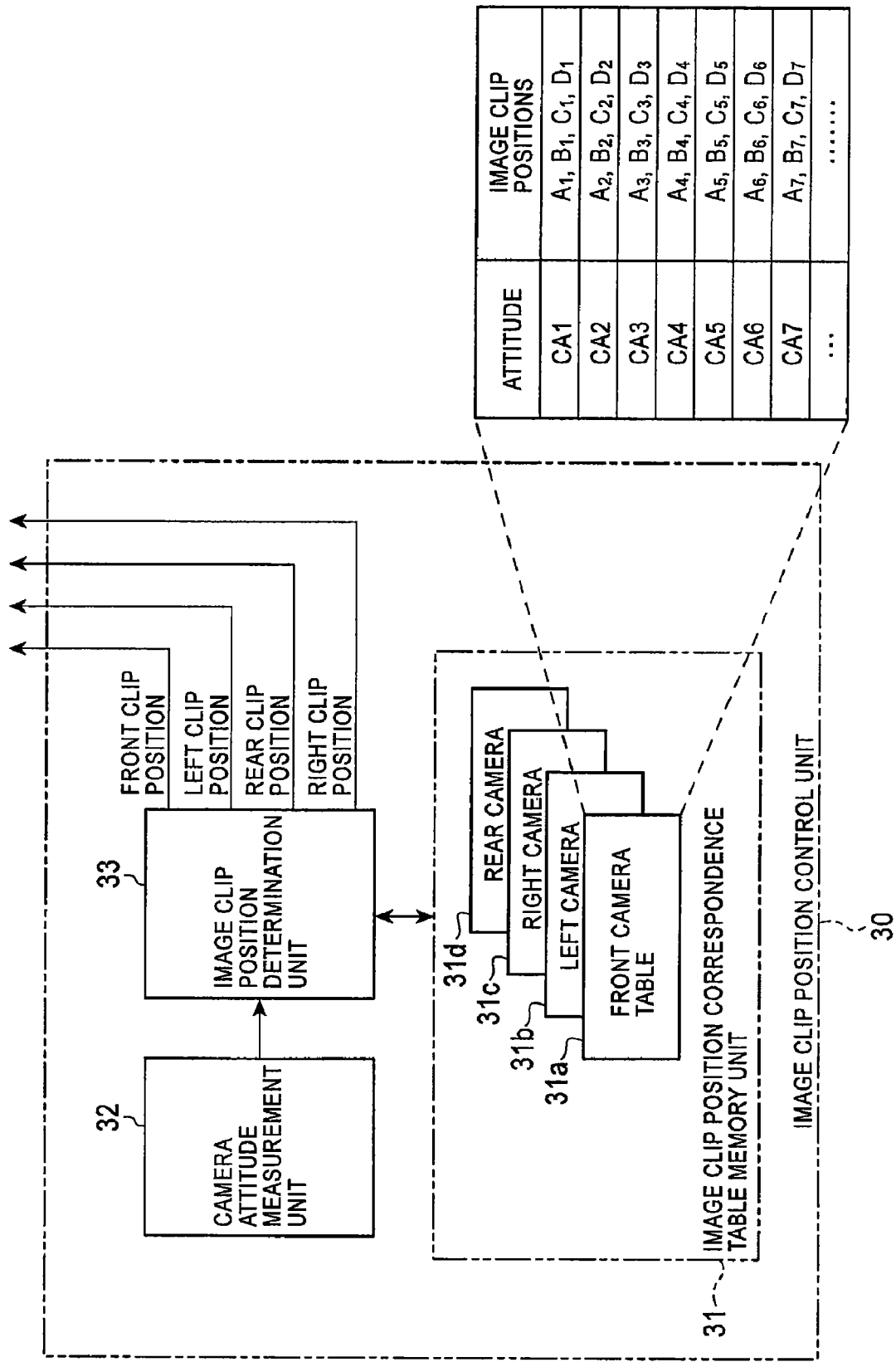
FIG. 10 is a diagram that schematically illustrates an example of the modified configuration of an image clip position control unit according to an exemplary embodiment of the invention.

FIG. 10 is a diagram that schematically illustrates an image clip position control unit according to an exemplary embodiment of the invention. As explained above, the image clip position control unit 13 shown in FIG. 7a) calculates the amount of change in the attitude of each camera, calculates a plurality of displacement vectors on the basis of the calculated amount of camera attitude change, 2) determines each image borderline between two adjacent images in such a manner that a difference in the directions of displacement vectors in the neighborhood of the image borderline between two adjacent images does not exceed a predetermined angle, and 3) sets each image portion that is demarcated by two image borderlines as an image clip area. For this reason, processing time and processing load are significant.

An image clip position control unit 30 shown in FIG. 10 has a pre-stored table that shows correspondences between camera attitudes CAi (where "i" is a positive integer of 1, 2, 3, . . . ) and includes sets of four image clip positions Ai, Bi, Ci, and Di for each camera. Each set of four image clip positions Ai, Bi, Ci, and Di specifies an image clip area. The image clip position control unit 30 measures the actual attitude of each camera. Then, the image clip position control unit 30 determines a set of four image clip positions Ai, Bi, Ci, and Di that corresponds to the actual attitude of each camera from the pre-stored table, and outputs it to the corresponding image clipping units 14a, 14b, 14c, and 14d.

Figure 11:
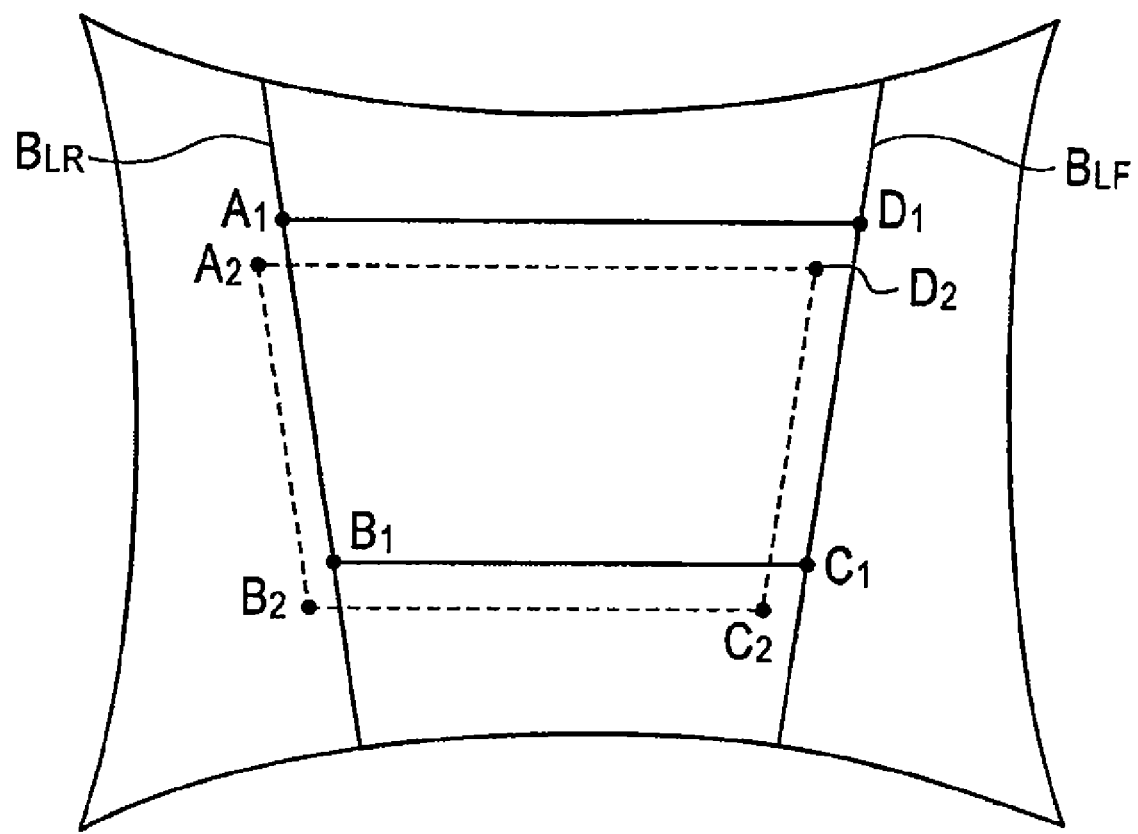
FIG. 11 is a diagram that schematically illustrates two sets of four image clip positions, each of which specifies an image clip area according to a modified example of an exemplary embodiment of the invention.

FIG. 11 is a diagram that schematically illustrates two sets of four image clip positions Ai, Bi, Ci, and Di, each of which specifies an image clip area. The first set of four image clip positions A1, B1, C1, and D1 corresponds to the first camera attitude CA1. The second set of four image clip positions A2, B2, C2, and D2 corresponds to the second camera attitude CA2. Note that other sets are omitted from the drawing. Each of the reference numerals BLR and BLF shown in FIG. 11 denotes an image borderline that is determined in step S106 of FIG. 9. Each set of four image clip positions Ai, Bi, Ci, and Di shown in FIG. 11 denotes an image clip area (i.e., positions) that is set in step S109 of FIG. 9.

The image clip position control unit 30 has an image clip position correspondence table memory unit 31, which stores correspondences between camera attitudes CAi, and sets of four image clip positions Ai, Bi, Ci, and Di for each camera, which have been calculated in advance. The image clip position correspondence table memory unit 31 is provided with a front camera table 31a, a left camera table 31b, a right camera table 31c, and a rear camera table 31d.

A camera attitude measurement unit 32 measures the amount of change in the attitude of each camera. An image clip position determination unit 33 reads a set of four image clip positions Ai, Bi, Ci, and Di that correspond to the attitude CAi of each camera, out of the corresponding camera table 31a, 31b, 31c, and 31d, respectively. Then, the image clip position determination unit 33 outputs it to the corresponding image clipping units 14a, 14b, 14c, and 14d. The image clip position control unit 30 described above permits rapid and easy determination of an image clip area.

Figure 12:
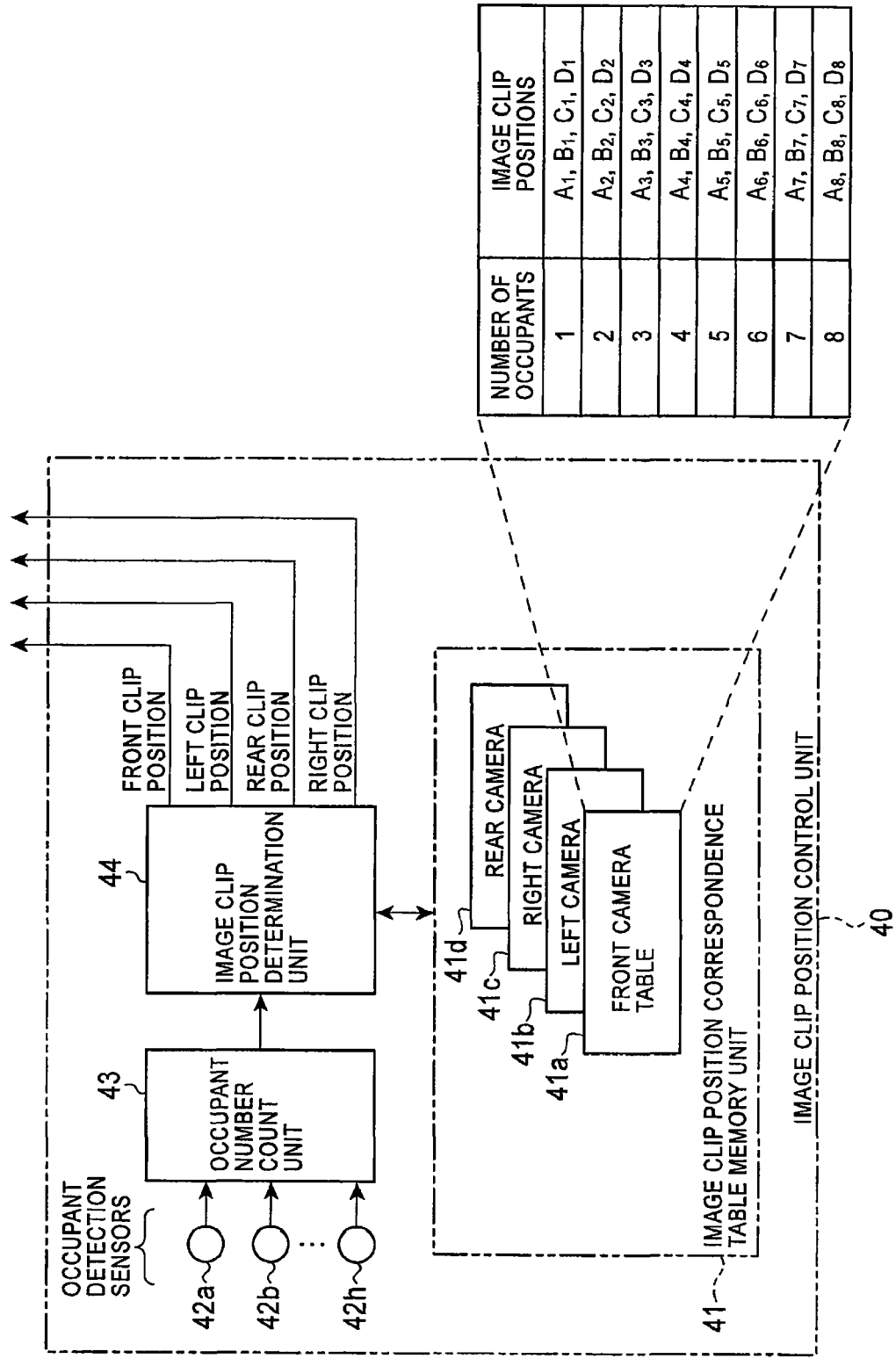
FIG. 12 is a diagram that schematically illustrates a modified configuration of an image clip position control unit according to an exemplary embodiment of the invention.

FIG. 12 is a diagram that schematically illustrates another example of the image clip position control unit. As explained above, the image clip position control unit 30 shown in FIG. 10 has a pre-stored table that shows the correspondence between camera attitudes CAi and sets of four image clip positions Ai, Bi, Ci, and Di for each camera. In contrast, an image clip position control unit 40 shown in FIG. 12 has a pre-stored table that shows correspondences between the number of occupants of a vehicle and sets of four image clip positions Ai, Bi, Ci, and Di for each camera.

The attitude of each camera changes as the number of occupants of a vehicle changes. In this example, each image borderline between two adjacent images is predetermined in such a manner that a difference in the directions of displacement vectors in the neighborhood of the image borderline is substantially small or preferably equal to about zero for each possible number of occupants of a vehicle. Multiple sets of four image clip positions Ai, Bi, Ci, and Di are pre-calculated on the basis of each image borderline.

A table that shows the correspondence between the number of occupants of a vehicle and sets of four image clip positions Ai, Bi, Ci, and Di is prepared for each camera. More specifically, the image clip position control unit 40 has an image clip position correspondence table memory unit 41, which stores the correspondence between the number of occupants of a vehicle and sets of four image clip positions Ai, Bi, Ci, and Di for each camera, which have been determined in advance. The image clip position correspondence table memory unit 41 is provided with a front camera table 41a, a left camera table 41b, a right camera table 41c, and a rear camera table 41d. It is assumed in this example, the vehicle CAR seats eight.

Figure 13A:
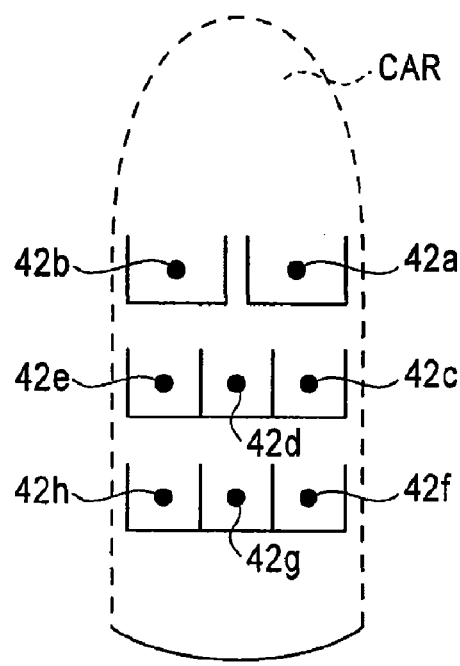
FIGS. 13A and 13B illustrate detection of the number of occupants that is performed with the use of occupant detection sensors.
Figure 13B:
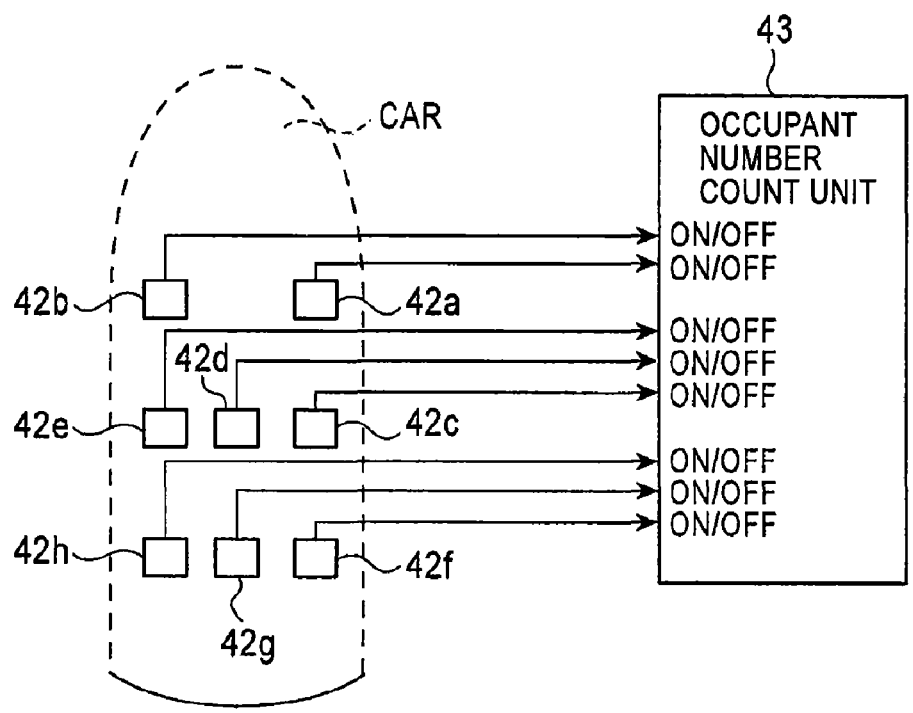

The vehicle CAR has eight occupant detection sensors 42a-42h. As shown in FIG. 13, each of the occupant detection sensors 42a-42h is embedded in a seat, and outputs an ON signal to an occupant number count unit 43 if there is an occupant sitting in that seat. Each of the occupant detection sensors 42a-42h outputs an OFF signal to the occupant number count unit 43 if there is no occupant sitting on the seat. The occupant number count unit 43 counts the number of ON signals that are sent from the occupant detection sensors 42a-42h to determine the number of occupants.

Then, the occupant number count unit 43 outputs the value of the number of occupants to an image clip position determination unit 44. The image clip position determination unit 44 reads, for each camera, a set of four image clip positions Ai, Bi, Ci, and Di that correspond to the number of occupants of the vehicle CAR, out of the corresponding camera table 41a-41d, respectively. The image clip position determination unit 44 then outputs the data to the corresponding image clipping units 14a, 14b, 14c, and 14d.

The image clip position control unit 40 shown in FIG. 12 facilitates rapid determination of an image clip area because it is not necessary to measure the attitude of a camera. In the foregoing description of the configuration of the image clip position control unit 40, the correspondences between the number of occupants of a vehicle and the sets of four image clip positions Ai, Bi, Ci, and Di are stored in a table for each camera. However, the scope of this modification example of the invention is not limited thereto. For example, each pre-stored table may contain correspondences between, in addition to the number of occupants of a vehicle, onboard positions and sets of four image clip positions Ai, Bi, Ci, and Di. That is, each pre-stored table may contain correspondences between the number of occupants of a vehicle and sets of four image clip positions Ai, Bi, Ci, and Di relative to the onboard positions.

Figure 14:
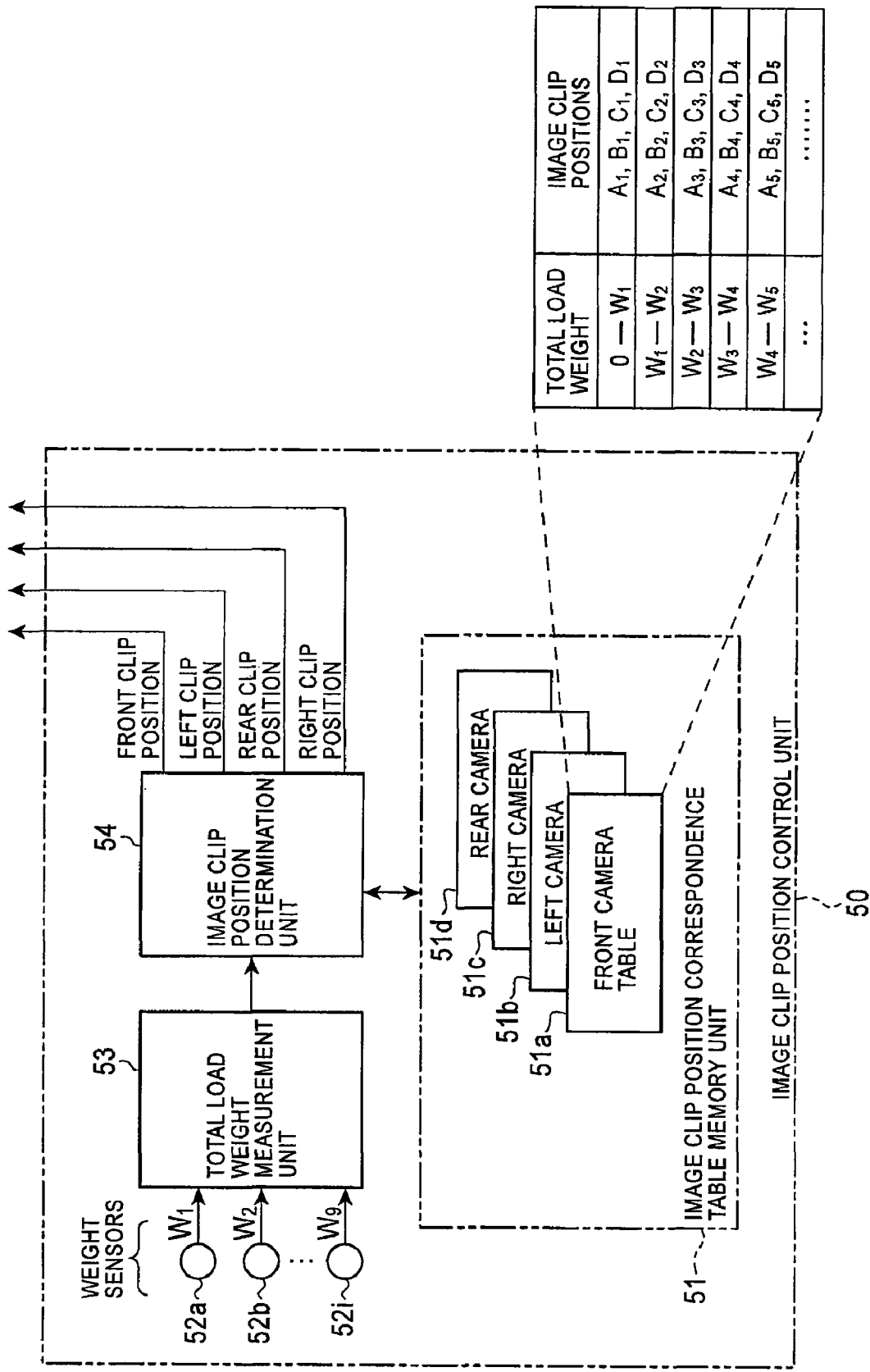
FIG. 14 is a diagram that schematically illustrates an image clip position control unit according to an exemplary embodiment of the invention.

FIG. 14 schematically illustrates another example of the image clip position control unit according to an exemplary embodiment. An image clip position control unit 50 shown in FIG. 14 includes a pre-stored table that shows the correspondence between the total load weight of the vehicle CAR (the aggregate weight of occupants and luggage excluding the weight of the vehicle CAR itself), and sets of four image clip positions Ai, Bi, Ci, and Di for each camera. Each set of four image clip positions Ai, Bi, Ci, and Di specifies an image clip area. The image clip position control unit 50 determines a set of four image clip positions Ai, Bi, Ci, and Di that correspond to the actual total load weight of the vehicle CAR for each camera from the pre-stored table, and outputs it to the corresponding image clipping unit 14a, 14b, 14c, and 14d.

The attitude of each camera changes as the total load weight of a vehicle increases/decreases. In this example, each image borderline between two adjacent images is predetermined in such a manner that a difference in the directions of displacement vectors in the neighborhood of the image borderline between two adjacent images, is substantially small, and preferably about zero, for each range of the total load weight of a vehicle.

Multiple sets of four image clip positions Ai, Bi, Ci, and Di are pre-calculated on the basis of the above-described image borderline. A table that shows correspondences between the total load weight of a vehicle and sets of four image clip positions Ai, Bi, Ci, and Di is prepared for each camera. More specifically, the image clip position control unit 50 has an image clip position correspondence table memory unit 51, which stores the correspondence between the total load weight of a vehicle and sets of four image clip positions Ai, Bi, Ci, and Di for each camera, which have been determined in advance. The image clip position correspondence table memory unit 51 is provided with a front camera table 51a, a left camera table 51b, a right camera table 51c, and a rear camera table 51d.

Figure 15:
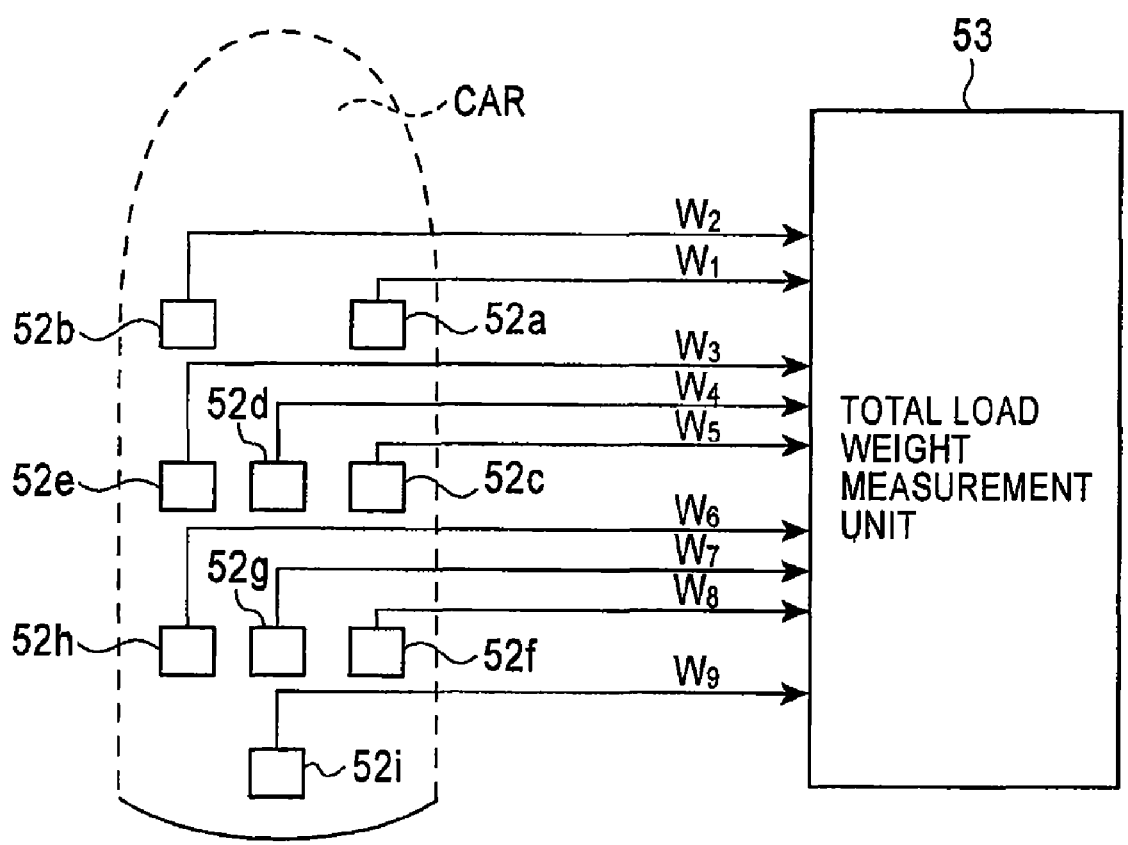
FIG. 15 is a diagram that schematically illustrates the measurement of the total load weight of a vehicle according to an exemplary embodiment of the invention.

As shown in FIG. 15, weight sensors 52a-52i are embedded in the seats and in the trunk of the vehicle CAR. Each of the weight sensors 52a-52h measures the weight (W1-W8) of an occupant sitting on the corresponding seat, as well as carry-on luggage, if any, and outputs information on the detected weight to a total load weight measurement unit 53. The weight sensor 52i measures the weight W9 of in-trunk luggage, if any, and outputs information on the detected weight to the total load weight measurement unit 53.

The total load weight measurement unit 53 calculates the sum of the detected weights sent from the weight sensors 52a-52i to obtain information on the total load weight of the vehicle CAR. Then, the total load weight measurement unit 53 outputs the obtained information on the total load weight of the vehicle CAR to an image clip position determination unit 54. The image clip position determination unit 54 reads, for each camera, a set of four image clip positions Ai, Bi, Ci, and Di that corresponds to the total load weight of the vehicle CAR, out of the corresponding camera table 51a-51d. Then, the image clip position determination unit 54 outputs it to the corresponding image clipping unit 14a, 14b, 14c, and 14d.

The image clip position control unit 50 shown in FIG. 14 facilitates rapid and easy determination of an image clip area because it is not necessary to measure the attitude of a camera. In the foregoing description of the image clip position control unit 50, the correspondence between the total load weight of a vehicle and the sets of four image clip positions Ai, Bi, Ci, and Di are stored in a table for each camera.

However, the scope of this example of the invention is not limited thereto. For example, each pre-stored table may contain correspondence between, in addition to the total load weight of a vehicle, weight distribution and sets of four image clip positions Ai, Bi, Ci, and Di. That is, each pre-stored table may contain the correspondence between the total load weight of a vehicle and sets of four image clip positions Ai, Bi, Ci, and Di relative to the weight distribution.

FIG. 16 schematically illustrates still another example of an image clip position control unit according to an exemplary embodiment of the invention. An image clip position control unit 60 shown in FIG. 16 has a pre-stored table that shows the correspondence between the height of the vehicle CAR and sets of four image clip positions Ai, Bi, Ci, and Di for each camera. Each set of four image clip positions Ai, Bi, Ci, and Di specifies an image clip area. The image clip position control unit 60 finds a set of four image clip positions Ai, Bi, Ci, and Di that corresponds to the actual height of the vehicle CAR for each camera from the pre-stored table, and outputs it to the corresponding image clipping unit 14a, 14b, 14c, and 14d.

The attitude of each camera changes as the height of a vehicle changes. In this example, each image borderline between two adjacent images is predetermined in such a manner that a difference in the directions of displacement vectors in the neighborhood of the image borderline between two adjacent images is substantially small, and preferably about zero for each range of the height of a vehicle. Multiple sets of four image clip positions Ai, Bi, Ci, and Di are pre-calculated on the basis of the above-mentioned each image borderline.

A table that shows correspondences between the height of a vehicle and sets of four image clip positions Ai, Bi, Ci, and Di is been prepared for each camera. More specifically, the image clip position control unit 60 has an image clip position correspondence table memory unit 61, which stores the correspondences between the height of a vehicle and sets of four image clip positions Ai, Bi, Ci, and Di for each camera, which have been determined in advance. The image clip position correspondence table memory unit 61 is provided with a front camera table 61a, a left camera table 61b, a right camera table 61c, and a rear camera table 61d.

Figure 17A:
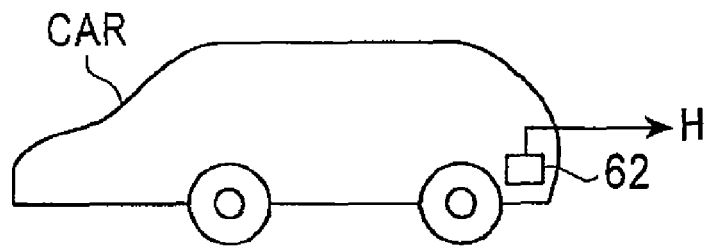
FIGS. 17A and 17B illustrate the detection of the height of a vehicle according to an exemplary embodiment of the invention.
Figure 17B:
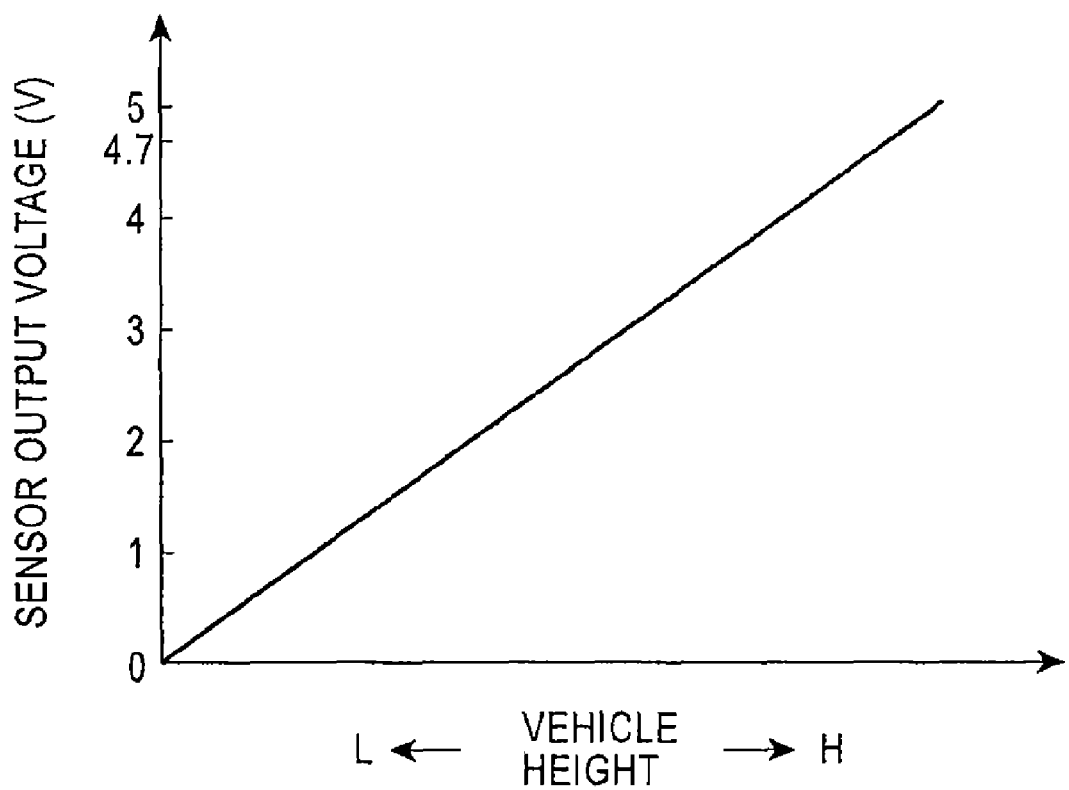

As shown in FIG. 17A, a vehicle height detection sensor 62 is provided at the rear of the vehicle CAR. The vehicle height detection sensor 62 outputs a sensor detection output voltage to a vehicle height detection unit 63. As shown in FIG. 17B, the level of a sensor detection output voltage is proportional to the height of the vehicle CAR. The vehicle height detection unit 63 obtains information on the height of the vehicle CAR on the basis of the received sensor output. Then, the vehicle height detection unit 63 outputs the obtained information on the height "h" of the vehicle CAR to an image clip position determination unit 64.

The image clip position determination unit 64 reads, for each camera, a set of four image clip positions Ai, Bi, Ci, and Di that corresponds to the height of the vehicle CAR, out of the corresponding camera table 61a-61d, respectively. Then, the image clip position determination unit 64 outputs it to the corresponding image clipping unit 14a, 14b, 14c, and 14d. The image clip position control unit 60 shown in FIG. 16 facilitates rapid and easy determination of an image clip area because it is not necessary to measure the attitude of a camera.

In the foregoing description of the invention, it is assumed that the vehicle CAR is provided with four cameras. However, any suitable number of cameras may be used to capture peripheral images at areas surrounding the vehicle CAR.

According to one embodiment, a plurality of displacement vectors is calculated for a plurality of points taken on the images that are captured by the plurality of cameras upon the application of a certain load that changes the attitude of a camera to the vehicle. Each image borderline is determined between two adjacent images in such a manner that a difference in the directions of displacement vectors in the neighborhood of the image borderline does not exceed a predetermined angle.

Thus, it is possible to prevent any part of an image from disappearing due to a change in the attitude of a camera and to prevent any part of an image, which was not shown before the change, from appearing due to the same reason. Accordingly, any object located at any peripheral area around a vehicle is displayed accurately without any missing or added portions.

Further, the correspondences between camera attitudes and sets of image clip positions, which are determined on the basis of the image borderlines, are pre-stored for each camera. An actual camera attitude is measured, and an image area portion is clipped in accordance with a set of image clip positions, which corresponds to the measured actual camera attitude for each camera so as to generate the combined image. Thus, it is not necessary to calculate the image borderlines and the image clip positions, which substantially reduces the processing load and processing time Although only a few exemplary embodiments have been described in detail above, those skilled in the art will readily appreciate that many modifications are possible in the exemplary embodiments without materially departing from the novel teachings and advantages of the invention. Accordingly, all such modifications are intended to be included within the scope of this invention as defined in the following claims.

What is claimed is:

1. An image display method for displaying a combined image of a vehicle, the method comprising:
   capturing images corresponding to areas surrounding a vehicle using a corresponding plurality of cameras fixedly mounted to the vehicle;
   calculating a plurality of displacement vectors for a plurality of points on each of the images captured by the cameras upon the application of a load to the vehicle sufficient to change an attitude of any of the plurality of cameras on the vehicle;
   determining image borderlines between two adjacent images such that a difference in the directions of displacement vectors in the neighborhood of each image borderline does not exceed a predetermined angle;
   combining the captured images into a virtual top-view image of the vehicle; and
   displaying the virtual top-view image on a display device.

2. The image display method according to claim 1, further comprising clipping an image portion that is demarcated by two image borderlines, out of the image captured by each of the plurality of cameras so as to generate the combined image.

3. The image display method according to claim 1, wherein determining each image borderline between two adjacent images includes
   determining a point such that a difference in directions of displacement vectors between two adjacent images does not exceed a predetermined angle; and
   determining each image borderline such that the image borderline passes through the point and extends in the same direction as that of the displacement vector.

4. The image display method according to claim 1, wherein determining each image borderline between two adjacent images includes
   finding a plurality of points such that differences in the directions of displacement vectors between two adjacent images, which are captured by two adjacent cameras, do not exceed a predetermined angle; and
   determining each image borderline such that the image borderline passes through the plurality of found points.

5. The image display method according to claim 1, further comprising:
   pre-storing correspondences between camera attitudes and sets of image clip positions, which are determined on the basis of the image borderlines, for each camera;
   measuring an actual camera attitude; and
   clipping an image area portion in accordance with a set of image clip positions that corresponds to the measured actual camera attitude for each camera to generate the combined image.

6. The image display method according to claim 1, further comprising:
   pre-storing correspondences between the number of occupants of a vehicle and sets of image clip positions, which are determined on the basis of the image borderlines, for each camera;
   determining an actual number of occupants of the vehicle; and
   clipping an image area portion in accordance with a set of image clip positions that corresponds to the actual number of the occupants of the vehicle to generate the combined image.

7. The image display method according to claim 1, further comprising:
   pre-storing correspondences between a total load weight of a vehicle and sets of image clip positions, which are determined on the basis of the image borderlines, for each camera;
   measuring an actual total load weight of the vehicle; and
   clipping an image area portion in accordance with a set of image clip positions that corresponds to the actual total load weight of the vehicle for each camera to generate the combined image.

8. The image display method according to claim 1, further comprising:
   pre-storing correspondences between a height of a vehicle and sets of image clip positions, which are determined on the basis of the image borderlines, for each camera;
   measuring an actual height of the vehicle; and
   clipping an image area portion in accordance with a set of image clip positions that corresponds to the actual height of the vehicle for each camera to generate the combined image.

9. The image display method according to claim 8, wherein each of the plurality of cameras is a fish-eye camera; and
   the set of image clip positions is used to specify an image clip area at which an image portion should be clipped out of a distortion-corrected fish-eye image, which is an image captured by the fish-eye camera and then corrected for distortion.

10. The image display method according to claim 7, wherein the total weight of the vehicle is the aggregate weight of occupants and luggage excluding the weight of the vehicle itself.

11. An image display apparatus for displaying a combined image of a vehicle, the apparatus comprising:
    a plurality of cameras fixedly mounted to the vehicle;
    a displacement vector calculating section configured to calculate a plurality of displacement vectors for a plurality of points on each of the images captured by the cameras upon the application of a load sufficient to change an attitude of any of the cameras on the vehicle;
    an image borderline determining section configured to determine image borderlines between two adjacent images such that a difference in the directions of displacement vectors in the neighborhood of each image borderline does not exceed a predetermined angle;
    an image combiner configured to combine the captured images into a virtual top-view image of the vehicle; and
    a display device configured to display the virtual top-view image.

12. The image display apparatus according to claim 11, further comprising:
    an image clip position determining section configured to determine positions at which an image portion should be clipped out of the image captured by each of the cameras on the basis of two image borderlines; and
    a combined-image generating section configured to generate the combined image by combining the clipped images with each other.

13. The image display apparatus according to claim 11, wherein
    the image borderline determining section determines a point such that a difference in the directions of displacement vectors between two adjacent images does not exceed a predetermined angle; and
    the image borderline determining section determines each image borderline such that the image borderline passes through the point and extends in the same direction as that of the displacement vector.

14. The image display apparatus according to claim 11, wherein the image borderline determining section determines a plurality of points such that differences in the directions of displacement vectors between two adjacent images, which are captured by two adjacent cameras, do not exceed a predetermined angle; and the image borderline determining section determines each image borderline such that the image borderline passes through the plurality of determined points.

15. The image display apparatus according to claim 11, further comprising:

a table configured to pre-store correspondences between camera attitudes and sets of image clip positions, which are determined on the basis of the image borderlines, for each camera;

a measuring section configured to measure an actual camera attitude;

an image clipping section configured to clip an image area portion based on a set of image clip positions that corresponds to the actual camera attitude for each camera; and a combined-image generating section configured to generate the combined image by combining the clipped images with each other.

16. The image display apparatus according to claim 11, further comprising:

a table configured to pre-store correspondences between the number of occupants of a vehicle and sets of image clip positions, which are determined on the basis of the image borderlines, for each camera;

an occupant-number detecting section configured to determine an actual number of the occupants of the vehicle;

an image clipping section configured to clip an image area portion in accordance with a set of image clip positions that corresponds to the number of the occupants of the vehicle for each camera; and a combined-image generating section configured to generate the combined image by combining the clipped images with each other.

17. The image display apparatus according to claim 11, further comprising:

a table configured to pre-store correspondences between a total load weight of a vehicle and sets of image clip positions, which are determined on the basis of the image borderlines, for each camera;

a load weight measuring section configured to measure an actual total load weight of the vehicle;

an image clipping section configured to clip that clips an image area portion in accordance with a set of image clip positions that corresponds to the actual total load weight of the vehicle for each camera; and a combined-image generating section configured to generate the combined image by combining the clipped images with each other.

18. The image display apparatus according to claim 11, further comprising:

a table configured to pre-store correspondences between a height of a vehicle and sets of image clip positions, which are determined on the basis of the image borderlines, for each camera;

a vehicle-height measuring section configured to measure the actual height of the vehicle;

an image clipping section configured to clip an image area portion in accordance with a set of image clip positions that corresponds to the actual height of the vehicle for each camera; and a combined-image generating section configured to generate the combined image by combining the clipped images with each other.

19. The image display apparatus according to claim 18, further comprising:

a plurality of fish-eye cameras; and a distortion correcting section configured to correct distortion of a fish-eye image captured by each of the plurality of fish-eye cameras;

wherein the set of image clip positions among the sets of image clip positions, which are stored in the table, is used to specify an image clip area at which an image portion should be clipped out of a distortion-corrected fish-eye image.

20. The image display apparatus according to claim 17, wherein the total weight of the vehicle is the aggregate weight of occupants and luggage excluding the weight of the vehicle itself.

* * * * *